(12) United States Patent
Chen et al.

(10) Patent No.: US 11,580,457 B2
(45) Date of Patent: Feb. 14, 2023

(54) PREDICTION METHOD, TERMINAL, AND SERVER

(71) Applicant: HUAWEI TECHNOLOGIES CO., LTD., Guangdong (CN)

(72) Inventors: Fei Chen, Hong Kong (CN); Zhenhua Dong, Shenzhen (CN); Zhenguo Li, Hong Kong (CN); Xiuqiang He, Shenzhen (CN); Li Qian, Shenzhen (CN); Shuaihua Peng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 306 days.

(21) Appl. No.: 16/863,110

(22) Filed: Apr. 30, 2020

(65) Prior Publication Data

US 2020/0258006 A1 Aug. 13, 2020

Related U.S. Application Data

(63) Continuation of application No. PCT/CN2017/120294, filed on Dec. 29, 2017.

(30) Foreign Application Priority Data

Nov. 7, 2017 (CN) .......................... 201711084325.2

(51) Int. Cl.
*G06N 5/02* (2006.01)
*G06N 20/00* (2019.01)

(52) U.S. Cl.
CPC .............. *G06N 20/00* (2019.01); *G06N 5/02* (2013.01)

(58) Field of Classification Search
CPC ................................ G06N 20/00; G06N 5/02
See application file for complete search history.

(56) References Cited

U.S. PATENT DOCUMENTS

2016/0179967 A1 6/2016 Sa et al.
2017/0372229 A1* 12/2017 Ura ........................ G06N 20/00
(Continued)

FOREIGN PATENT DOCUMENTS

CN 102508907 B 11/2013
CN 105528652 A 4/2016
(Continued)

OTHER PUBLICATIONS

EPO Communication pursuant to Article 94(3) EPC issued in European Application No. 17931484.4 dated May 25, 2021, 6 pages.
(Continued)

*Primary Examiner* — Adnan M Mirza
(74) *Attorney, Agent, or Firm* — Fish & Richardson P.C.

(57) ABSTRACT

Example prediction methods and apparatus are described. One example includes sending a first model parameter and a second model parameter by a server to a plurality of terminals. The first model parameter and the second model parameter are adapted to a prediction model of the terminal. The server receives a first prediction loss sent by at least one of the plurality of terminals. A first prediction loss sent by each of the at least one terminal is calculated by the terminal based on the prediction model that uses the first model parameter and the second model parameter. The server updates the first model parameter based on the first prediction loss sent by the at least one terminal to obtain an updated first model parameter. The server updates the second model parameter based on the first prediction loss sent by the at least one terminal to obtain an updated second model parameter.

20 Claims, 7 Drawing Sheets

Server

Terminal

(56) References Cited

U.S. PATENT DOCUMENTS

2019/0034833 A1  1/2019  Ding et al.
2019/0318202 A1  10/2019  Zhao et al.
2020/0066392 A1*  2/2020  Bess .................... G16H 50/70

FOREIGN PATENT DOCUMENTS

| CN | 106548210 A | 3/2017 |
|---|---|---|
| CN | 107153630 A | 9/2017 |
| CN | 107169573 A | 9/2017 |
| CN | 107229966 A | 10/2017 |
| WO | 2013074634 A1 | 5/2013 |
| WO | 2017143921 A1 | 8/2017 |
| WO | 2017167095 A1 | 10/2017 |

OTHER PUBLICATIONS

Yakut et al., "Privacy-Preserving Eigentaste-Based Collaborative Filtering", IWSEC 2007, LNCS 4752, XP019073150, Oct. 29, 2007, 16 pages.

Mcmahan et al., "Communication-Efficient Learning of Deep Networks from Decentralized Data", Proceedings of the 20th International Conference on Artificial Intelligence and Statistics (AISTATS), Feb. 28, 2017, 11 pages.

Extended European Search Report issued in European Application No. 17931484.4 dated Jun. 19, 2020, 8 pages.

PCT International Search Report and Written Opinion in International Application No. PCT/CN2017/120,294, dated Aug. 6, 2018, 15 pages (With English Translation).

Office Action issued in Chinese Application No. 201711084325.2 dated Oct. 19, 2022, 7 pages.

* cited by examiner

Server    Terminal

PREDICTION METHOD, TERMINAL, AND SERVER

CROSS-REFERENCE TO RELATED APPLICATIONS

This application is a continuation of International Application No. PCT/CN2017/120294, filed on Dec. 29, 2017, which claims priority to Chinese Patent Application No. 201711084325.2, filed on Nov. 7, 2017. The disclosures of the aforementioned applications are hereby incorporated by reference in their entireties.

TECHNICAL FIELD

The present invention relates to the prediction model field, and in particular, to a prediction method, a terminal, and a server.

BACKGROUND

A machine learning-based prediction system is typically divided into two parts: model training and prediction. (1) Model training means performing training to obtain a prediction model applicable to a specific task by using training set data, where a training set usually includes a large amount of data. (2) Prediction means predicting test set data by using the model obtained through training. When conventional machine learning is used to tackle a terminal prediction task, in one manner, model training is performed separately on a terminal, and only samples of a single terminal user can be used instead of information about a large quantity of other users (such as similar mobile phone usage habits), resulting in an unsatisfactory prediction effect; and in another manner, a unified prediction model is trained on a cloud side server, but a relatively large scale of the model also affects a single-user prediction effect.

How a large amount of user data is used to perform training to obtain a prediction model that can reflect a user difference while user privacy is protected is an issue that needs to be resolved.

SUMMARY

Embodiments of the present invention provide a prediction method, a terminal, and a server, so as to obtain a prediction model that reflects a user difference by performing training by using a large amount of user data.

According to a first aspect, an embodiment of the present invention provides a prediction method, including:

sending, by a server, a first model parameter and a second model parameter to a plurality of terminals, where the first model parameter and the second model parameter are adapted to a prediction model of the terminal; receiving a first prediction loss sent by at least one of the plurality of terminals, where a first prediction loss sent by each of the at least one terminal is calculated by the terminal based on the prediction model that uses the first model parameter and the second model parameter; and updating the first model parameter based on the first prediction loss sent by the at least one terminal, to obtain an updated first model parameter, and updating the second model parameter based on the first prediction loss sent by the at least one terminal, to obtain an updated second model parameter.

In the first aspect, the prediction model may be trained on each terminal, so that user privacy of each terminal can be protected; and the terminal feeds back the calculated prediction loss to the server, so that the server updates the model parameters based on a large amount of data fed back by the terminal. In this way, the model parameters can be accurately updated by using a large amount of user information.

In an optional embodiment, the updating, by the server, the first model parameter based on the first prediction loss sent by the at least one terminal, to obtain an updated first model parameter, and updating the second model parameter based on the first prediction loss sent by the at least one terminal, to obtain an updated second model parameter is specifically: calculating, by the server, a second prediction loss based on the first prediction loss sent by the at least one terminal; and updating, by the server, the first model parameter based on the second prediction loss according to a parameter update rule, to obtain the updated first model parameter, and updating, by the server, the second model parameter based on the second prediction loss according to the parameter update rule, to obtain the updated second model parameter.

In an optional embodiment, the server may further send the updated first model parameter and the updated second model parameter to the plurality of terminals, and any one of the plurality of terminals performs prediction based on a prediction model that uses the updated first model parameter and the updated second model parameter.

In an optional embodiment, the plurality of terminals belong to a same group, and the terminals in the same group have a common characteristic. Optionally, the common characteristic includes that at least two terminals are located within a preset geographical area. Because terminal users belonging to a same group have more commonality, a corresponding meta-learner can be more targeted for learning a mechanism suitable for the group. In this way, a prediction model more suitable for the terminals in the group can be obtained through training, thereby achieving a better prediction effect.

According to a second aspect, an embodiment of the present invention provides a prediction method, including:

receiving, by a terminal, a first model parameter and a second model parameter that are sent by a server, where the first model parameter and the second model parameter are adapted to a prediction model of the terminal; updating the first model parameter based on a training set and the prediction model, to obtain an updated first model parameter, where the training set includes a plurality of pieces of first sample data, and the first sample data includes a first eigenvector and a first sample label corresponding to the first eigenvector; obtaining a test set, and calculating a first prediction loss of the test set based on a prediction model that uses the updated first model parameter and the second model parameter, where the test set includes a plurality of pieces of second sample data, and the second sample data includes a second eigenvector and a second sample label corresponding to the second eigenvector; and sending the first prediction loss to the server, so that the server updates the first model parameter and the second model parameter based on the first prediction loss.

In the second aspect, the prediction model may be trained on a plurality of terminals, so that the terminals do not need to upload data of the terminals to the server, thereby protecting user privacy of each terminal; and the terminal feeds back the calculated prediction loss to the server, so that the server updates the model parameters based on a large amount of data fed back by the terminal. In this way, the model parameters can be accurately updated by using a large amount of user information.

In an optional embodiment, the aspect of updating, by the terminal, the first model parameter based on a training set and the prediction model, to obtain an updated first model parameter specifically includes: calculating a second prediction loss of the training set based on the prediction model, where the prediction model uses the first model parameter and the second model parameter; and updating the first model parameter based on the second prediction loss and the second model parameter according to a parameter update rule, to obtain the updated first model parameter.

Optionally, the aspect of calculating, by the terminal, a second prediction loss of the training set based on the prediction model specifically includes: calculating, based on the prediction model, a prediction loss corresponding to each of the plurality of pieces of first sample data; and calculating the second prediction loss of the plurality of pieces of first sample data based on the prediction loss corresponding to each piece of first sample data.

Optionally, the aspect of calculating, by the terminal based on the prediction model, a prediction loss corresponding to each of the plurality of pieces of first sample data specifically includes: inputting the first eigenvector of each piece of first sample data into the prediction model, to obtain a probability that the first eigenvector of each piece of first sample data is corresponding to the first sample label, where the prediction model uses the first model parameter and the second model parameter; and calculating, based on the probability that the first eigenvector is corresponding to the first sample label, the prediction loss of each piece of first sample data according to a loss calculation rule.

Optionally, the aspect of inputting, by the terminal, the first eigenvector of each piece of first sample data into the prediction model, to obtain a probability that the first eigenvector of each piece of first sample data is corresponding to the first sample label specifically includes: obtaining a plurality of reference sample labels included in the prediction model, where the plurality of reference sample labels include all the first sample labels; inputting the first eigenvector of each piece of first sample data into the prediction model, to obtain a probability that the first eigenvector is corresponding to each reference sample label; and determining a corresponding probability when the reference sample label is the first sample label, as the probability that the first eigenvector is corresponding to the first sample label.

In an optional embodiment, the aspect of calculating, by the terminal, a first prediction loss of the test set based on a prediction model that uses the updated first model parameter and the second model parameter specifically includes: calculating, based on the prediction model obtained after the model parameter updating, a prediction loss corresponding to each of the plurality of pieces of second sample data that are included in the test set, where the prediction model obtained after the model parameter updating uses the updated first model parameter and the second model parameter; and calculating the first prediction loss of the test set based on the prediction loss corresponding to each piece of second sample data.

Optionally, the aspect of calculating, by the terminal based on the prediction model obtained after the model parameter updating, a prediction loss corresponding to each of the plurality of pieces of second sample data that are included in the test set specifically includes: inputting the second eigenvector of each piece of second sample data into the prediction model obtained after the model parameter updating, to obtain a probability that the second eigenvector of each piece of second sample data is corresponding to the second sample label; and calculating, based on the probability that the second eigenvector is corresponding to the second sample label, the prediction loss of each piece of second sample data according to the loss calculation rule.

Optionally, the aspect of inputting, by the terminal, the second eigenvector of each piece of second sample data into the prediction model obtained after the model parameter updating, to obtain a probability that the second eigenvector of each piece of second sample data is corresponding to the second sample label specifically includes: obtaining a plurality of reference sample labels included in the prediction model obtained after the model parameter updating, where the plurality of reference sample labels include all the second sample labels; inputting the second eigenvector of each piece of second sample data into the prediction model obtained after the model parameter updating, to obtain a probability that the second eigenvector is corresponding to each reference sample label; and determining a corresponding probability when the reference sample label is the second sample label, as the probability that the second eigenvector is corresponding to the second sample label.

According to a third aspect, an embodiment of the present invention provides a prediction method, including:
receiving, by a terminal, a first model parameter and a second model parameter that are sent by a server, where the first model parameter and the second model parameter are adapted to a prediction model of the terminal: updating the first model parameter based on a training set and the prediction model, to obtain an updated first model parameter, where the training set includes a plurality of pieces of sample data, and each piece of sample data includes an eigenvector and a sample label corresponding to the eigenvector; and inputting a target eigenvector used for prediction into a prediction model that uses the updated first model parameter and the second model parameter, to obtain a target sample label corresponding to the target eigenvector.

In the third aspect, after receiving the first model parameter and the second model parameter that are sent by the server, the terminal first updates the first model parameter based on the training set and the prediction model, to obtain the updated first model parameter; inputs the target eigenvector used for prediction into the prediction model that uses the updated first model parameter; and obtains the target sample label corresponding to the target eigenvector. In this way, a difference between the terminal and another terminal can be reflected at a prediction stage of the terminal, thereby achieving a more accurate prediction effect.

In an optional embodiment, the aspect of updating, by the terminal, the first model parameter based on a training set and the prediction model, to obtain an updated first model parameter specifically includes: calculating an intermediate prediction loss of the training set based on the prediction model, here the prediction model uses the first model parameter and the second model parameter; and updating, by the terminal, the first model parameter based on the intermediate prediction loss and the second model parameter according to a parameter update rule, to obtain the updated first model parameter. The intermediate prediction loss can reflect a deviation between an actual result of a first training set and a prediction result of the first training set. The first model parameter is updated by using this deviation, to improve accuracy of the prediction model.

Optionally, the aspect of calculating, by the terminal, an intermediate prediction loss of the training set based on the prediction model specifically includes: calculating, based on the prediction model, a prediction loss corresponding to each of the plurality of pieces of sample data; and calculating the intermediate prediction loss of the plurality of pieces of sample data based on the prediction loss corresponding to each piece of sample data.

Optionally, the aspect of calculating, by the terminal based on the prediction model, a prediction loss of each of the plurality of pieces of sample data specifically includes: inputting, by the terminal, the eigenvector of each piece of sample data into the prediction model, to obtain a probability that the eigenvector of each piece of sample data is corresponding to the sample label; and calculating, based on the probability that the eigenvector is corresponding to the sample label, the prediction loss of each piece of sample data according to a loss calculation rule.

Optionally, the aspect of inputting, by the terminal, the eigenvector of each piece of sample data into the prediction model, to obtain a probability that the eigenvector of each piece of sample data is corresponding to the sample label specifically includes: obtaining, by the terminal, a plurality of reference sample labels included in the prediction model, where the plurality of reference sample labels include all the sample labels; inputting, by the terminal, the eigenvector of each piece of sample data into the prediction model, to obtain a probability that the eigenvector is corresponding to each reference sample label; and determining, by the terminal, a corresponding probability when the reference sample label is the sample label, as the probability that the eigenvector is corresponding to the sample label.

In an optional embodiment, the aspect of inputting, by the terminal, a target eigenvector used for prediction into a prediction model that uses the updated first model parameter and the second model parameter, to obtain a target sample label corresponding to the target eigenvector specifically includes: obtaining, by the terminal, a plurality of reference sample labels included in the prediction model obtained after the model parameter updating, where the prediction model obtained after the model parameter updating uses the updated first model parameter and the second model parameter; inputting, by the terminal, the target eigenvector used for prediction into the prediction model obtained after the model parameter updating, to obtain a reference probability that the target eigenvector used for prediction is corresponding to each reference sample label; and determining, by the terminal, a reference sample label corresponding to a maximum reference probability value among a plurality of reference probabilities, as the target sample label.

According to a fourth aspect, an embodiment of the present invention provides a server, including:

a sending module, configured to send a first model parameter and a second model parameter to a plurality of terminals, where the first model parameter and the second model parameter are adapted to a prediction model of the terminal;

a receiving module, configured to receive a first prediction loss sent by at least one of the plurality of terminals, where a first prediction loss sent by each of the at least one terminal is calculated by the terminal based on the prediction model that uses the first model parameter and the second model parameter; and a processing module, configured to: update the first model parameter based on the first prediction loss sent by the at least one terminal, to obtain an updated first model parameter, and update the second model parameter based on the first prediction loss sent by the at least one terminal, to obtain an updated second model parameter.

Optionally, the server may further implement some or all of the optional implementations of the first aspect.

According to a fifth aspect, an embodiment of the present invention provides a server. The server includes: a memory, configured to store computer-executable program code; a transceiver; and a processor. The processor is coupled to the memory and the transceiver. The program code stored in the memory includes an instruction. When the processor executes the instruction, the server is enabled to perform the method performed by the server in the first aspect.

According to a fifth aspect, an embodiment of the present invention provides a terminal, including:

a receiving module, configured to receive a first model parameter and a second model parameter that are sent by a server, where the first model parameter and the second model parameter are adapted to a prediction model of the terminal;

a processing module, configured to update the first model parameter based on a training set and the prediction model, to obtain an updated first model parameter, where the training set includes a plurality of pieces of first sample data, and the first sample data includes a first eigenvector and a first sample label corresponding to the first eigenvector;

the processing module is specifically configured to: obtain a test set, and calculate a first prediction loss of the test set based on a prediction model that uses the updated first model parameter, where the test set includes a plurality of pieces of second sample data, and the second sample data includes a second eigenvector and a second sample label corresponding to the second eigenvector; and a sending module, configured to send the first prediction loss to the server, so that the server updates the first model parameter and the second model parameter based on the first prediction loss.

Optionally, the terminal may further implement some or all of the optional implementations of the second aspect.

According to a sixth aspect, an embodiment of the present invention provides another terminal, including:

a receiving module, configured to receive a first model parameter and a second model parameter that are sent by a server, where the first model parameter and the second model parameter are adapted to a prediction model of the terminal; and a processing module, configured to update the first model parameter based on a training set and the prediction model, to obtain an updated first model parameter, where the training set includes a plurality of pieces of sample data, and each piece of sample data includes an eigenvector and a sample label corresponding to the eigenvector; and the processing module is further configured to input a target eigenvector used for prediction into a prediction model that uses the updated first model parameter and the second model parameter, to obtain a target sample label corresponding to the target eigenvector.

Optionally, the terminal may further implement some or all of the optional implementations of the third aspect.

According to a seventh aspect, an embodiment of the present invention provides a terminal. The terminal includes: a memory, configured to store computer-executable program code; a transceiver; and a processor. The processor is coupled to the memory and the transceiver. The program code stored in the memory includes an instruction. When the processor executes the instruction, the terminal is enabled to perform the method performed by the terminal in the second aspect or the third aspect.

According to an eighth aspect, a computer program product is provided. The computer program product includes computer program code. When the computer program code is run on a computer, the computer is enabled to perform the methods in the first to the third aspects and any possible implementation thereof.

According to a ninth aspect, a computer-readable medium is provided. The computer-readable medium stores program code. When the computer program code is run on a computer, the computer is enabled to perform the methods in the first to the third aspects and any possible implementation thereof.

According to a tenth aspect, a machine learning model training method is provided. The method includes: receiving, by a terminal, a first parameter and a second parameter of an algorithm model on a server that are sent by the server, where the first parameter is used as an initial parameter of a machine learning model of the terminal, and the second parameter is used to indicate a manner in which the terminal trains the machine learning model; training, by the terminal, the machine learning model on the terminal based on the first parameter, the second parameter, and training set data, where the training set data includes a plurality of training samples, each training sample includes a first eigenvector and a corresponding first label, and the first eigenvector is constructed based on user information in historical data of the terminal; obtaining, by the terminal, a test result based on test data and the machine learning model, and calculating a loss gradient based on the test result; and uploading, by the terminal, the loss gradient to the server, where the loss gradient is used by the server to update the first parameter and the second parameter.

In a possible implementation of the tenth aspect, the calculating a loss gradient based on the test result includes: calculating, by the terminal, a prediction loss based on the test result and a label that is corresponding to the test data; and calculating, by the terminal, the loss gradient based on the prediction loss.

In a possible implementation of the tenth aspect, the test data includes a plurality of pieces of test sample data, each piece of test sample data includes a second eigenvector and a corresponding second label, and each piece of test sample data is corresponding to one test result, where the calculating, by the terminal, a prediction loss based on the test result and a label that is corresponding to the test data includes: calculating, by the terminal, a prediction loss of each of the plurality of pieces of test sample data based on the test result and the second label that are corresponding to each of the plurality of pieces of test sample data:

the calculating, by the terminal, the loss gradient based on the prediction loss includes: calculating, by the terminal, a loss gradient of each of the plurality of pieces of test sample data based on the prediction loss of each of the plurality of pieces of test sample data, and performing, by the terminal, average processing on a plurality of loss gradients corresponding to the plurality of pieces of test sample data, to obtain a target loss gradient; and the uploading, by the terminal, the loss gradient to the server includes: uploading, by the terminal, the target loss gradient to the server.

In a possible implementation of the tenth aspect, the test data includes a plurality of pieces of test sample data, each piece of test sample data includes a second eigenvector and a corresponding second label, and each piece of test sample data is corresponding to one test result, where the calculating, by the terminal, a prediction loss based on the test result and a label that is corresponding to the test data includes: calculating, by the terminal, a prediction loss of each of the plurality of pieces of test sample data based on the test result and the second label that are corresponding to each of the plurality of pieces of test sample data and averaging, by the terminal, a plurality of prediction losses corresponding to the plurality of pieces of test sample data, to obtain an average prediction loss;

the calculating, by the terminal, the loss gradient based on the prediction loss includes: calculating, by the terminal, a target loss gradient based on the average prediction loss; and the uploading, by the terminal, the loss gradient to the server includes: uploading, by the terminal, the target loss gradient to the server.

In a possible implementation of the tenth aspect, after the calculating, by the terminal, a prediction loss of each of the plurality of pieces of test sample data based on the test result and the second label that are corresponding to each of the plurality of pieces of test sample data, the method further includes: determining, by the terminal, that the prediction loss of each of the plurality of pieces of test sample data satisfies a preset condition, there the preset condition is used to indicate that a fluctuation value relative to a last calculated average prediction loss is less than a preset threshold, and the average prediction loss is obtained by the terminal by averaging the plurality of prediction losses corresponding to the plurality of pieces of test sample data. Further, the method further includes: if the terminal determines that a prediction loss of test sample data i does not satisfy the preset condition, skipping calculating, by the terminal, a loss gradient corresponding to the prediction loss of the test sample data i, or skipping calculating the average prediction loss based on the prediction loss of the test sample data i, where the test sample data i is any one of the plurality of pieces of test sample data.

In a possible implementation of the tenth aspect, before the receiving, by a terminal, a first parameter and a second parameter of an algorithm model on a server that are sent by the server, the method includes: sending, by the terminal, a structure identifier of the machine learning model to the server, where the structure identifier is used by the server to determine, based on the structure identifier, the algorithm model corresponding to the machine learning model.

According to an eleventh aspect, a prediction method is provided. The method includes: obtaining, by a first terminal, user information of the first terminal, and generating a target eigenvector based on the user information; and inputting, by the first terminal, the target eigenvector into a target prediction model to obtain a target prediction result, where the target prediction model is a local machine learning model that is obtained through training by the first terminal based on a first parameter, a second parameter, and historical data of the first terminal, the first parameter and the second parameter are two parameters of an algorithm model on a server that are sent by the server, the first parameter is used as an initial parameter of the machine learning model of the first terminal, the second parameter is used to indicate a manner in which the first terminal trains the machine learning model, the first parameter and the second parameter are obtained by the server based on a plurality of loss gradients fed back by a plurality of terminals, and any loss gradient is calculated by a corresponding terminal based on local historical data.

In a possible implementation of the eleventh aspect, before the inputting, by the first terminal, the target eigenvector into a target prediction model to obtain a target prediction result, the method includes: sending, by the first terminal, a parameter update request to the server, where the parameter update request is used to request the server to send a last updated first parameter and second parameter of the algorithm model; receiving, by the first terminal, the last updated first parameter and second parameter that are sent by the server; and training, by the first terminal, the target prediction model based on the last updated first parameter and second parameter and the historical data of the first terminal, where the inputting, by the first terminal, the target eigenvector into a target prediction model to obtain a target prediction result includes: inputting, by the first terminal, the target eigenvector into a trained target prediction model to obtain the target prediction result.

Optionally, the parameter update request includes a structure identifier of the machine learning model corresponding to the target prediction model, and the structure identifier is used by the server to determine, based on the structure identifier, the algorithm model corresponding to the target prediction model.

In a possible implementation of the eleventh aspect, after the inputting, by the first terminal, the target eigenvector into a target prediction model to obtain a target prediction result, the method further includes: uploading, by the first terminal, a prediction result score to the server, where the prediction result score is given by a user of the first terminal for the target prediction result, the prediction result score is used by the server to determine a weighting coefficient, the weighting coefficient is used by the server to process the loss gradients uploaded by the plurality of terminals, to obtain a weighted loss gradient, the weighted loss gradient is used by the server to update the first parameter and the second parameter, and the plurality of terminals include the first terminal.

According to a twelfth aspect, a machine learning model training method is provided. The method includes: sending, by a server, a first parameter and a second parameter of an algorithm model on the server to a plurality of terminals, where the first parameter is used as an initial parameter of a machine learning model of each of the plurality of terminals, the second parameter is used to indicate a manner in which each of the plurality of terminals trains the machine learning model, and machine learning models of the plurality of terminals have a same structure; optionally, the plurality of terminals belong to a same group, and the same group is used to indicate that the plurality of terminals in the group have a same or similar attribute characteristic, and optionally, the attribute characteristic includes a geographical area; receiving, by the server within a preset time window, a loss gradient uploaded by at least one of the plurality of terminals; and updating, by the server, the first parameter and the second parameter based on the loss gradient uploaded by the at least one terminal.

In a possible implementation of the twelfth aspect, before the sending, by a server, a first parameter and a second parameter to a plurality of terminals, the method includes: initializing, by the server, the first parameter and the second parameter of the algorithm model.

In a possible implementation of the twelfth aspect, the method further includes: resetting, by the server, the preset time window based on a probability that the plurality of terminals upload the loss gradient.

In a possible implementation of the twelfth aspect, the method further includes: receiving, by the server, a prediction result score uploaded by the at least one terminal, where the prediction result score is given by a terminal user for a prediction result of the machine learning model; and determining, by the server, a weighting coefficient based on the prediction result score; and the updating, by the server, the first parameter and the second parameter based on the loss gradient uploaded by the at least one terminal includes: performing, by the server based on the weighting coefficient, weighted averaging processing on the loss gradient uploaded by the at least one terminal, to obtain a weighted loss gradient; and updating, by the server, the first parameter and the second parameter based on the weighted loss gradient.

In a possible implementation of the twelfth aspect, before the sending, by a server, a first parameter and a second parameter to a plurality of terminals, the method further includes: receiving, by the server, structure identifiers, uploaded by the plurality of terminals, of the respective machine learning models, where the structure identifier is used by the server to determine the algorithm model corresponding to the structure of the machine learning model.

In a possible implementation of the twelfth aspect, the method further includes: receiving, by the server, a parameter update request sent by a first terminal, where the parameter update request is used to request the server to send a last updated first parameter and second parameter, and the first terminal is any one of the plurality of terminals; and sending, by the server, the last updated first parameter and second parameter to the first terminal.

According to a thirteenth aspect, a terminal device is provided. The device includes: a processor and a storage medium. The storage medium is configured to store a programmable instruction; and the processor is configured to invoke the programmable instruction stored in the storage medium, to perform the method described in any one of the tenth aspect or the possible implementations of the tenth aspect.

According to a fourteenth aspect, a terminal device is provided. The device includes: a processor and a storage medium. The storage medium is configured to store a programmable instruction; and the processor is configured to invoke the programmable instruction stored in the storage medium, to perform the method described in any one of the eleventh aspect or the possible implementations of the eleventh aspect.

According to a fifteenth aspect, a server is provided. The server includes: a processor and a storage medium. The storage medium is configured to store a programmable instruction; and the processor is configured to invoke the programmable instruction stored in the storage medium, to perform the method described in any one of the twelfth aspect or the possible implementations of the twelfth aspect.

According to a sixteenth aspect, a computer-readable storage medium is provided, where the computer-readable storage medium includes an instruction. When the instruction is run on a computer, the computer is enabled to perform the method described in any one of the tenth aspect or the possible implementations of the tenth aspect.

According to a seventeenth aspect, a computer-readable storage medium is provided, where the computer-readable storage medium includes an instruction. When the instruction is run on a computer, the computer is enabled to perform the method described in any one of the eleventh aspect or the possible implementations of the eleventh aspect.

According to an eighteenth aspect, a computer-readable storage medium is provided, where the computer-readable storage medium includes an instruction. When the instruction is run on a computer, the computer is enabled to perform the method described in any one of the twelfth aspect or the possible implementations of the twelfth aspect.

By using the method and the apparatus that are provided in the embodiments of the present invention, the terminal can train the local machine learning model by using a large amount of other terminal user data, while the terminal does not upload local privacy data to the server. In addition, performance of the machine learning model can be improved and personalization of the machine learning model can be implemented.

BRIEF DESCRIPTION OF DRAWINGS

To describe the technical solutions in the embodiments of the present invention or in the background more clearly, the following describes the accompanying drawings required for describing the embodiments of the present invention or the background.

DESCRIPTION OF EMBODIMENTS

The following describes the embodiments of the present invention with reference to the accompanying drawings in the embodiments of the present invention.

Embodiment 1

Figure 1:
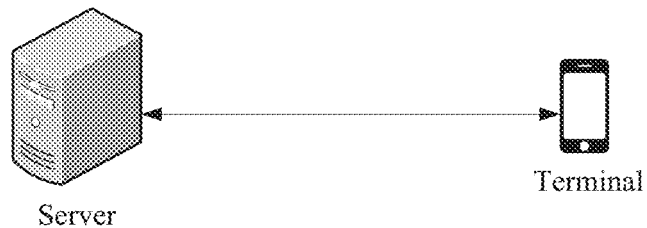
FIG. 1 is a possible prediction system architectural diagram according to an embodiment of the present invention.

FIG. 1 is a possible prediction system architectural diagram according to an embodiment of the present invention. As shown in FIG. 1, the prediction system architectural diagram includes a server and a terminal. Data can be transmitted between the server and the terminal. It should be noted that FIG. 1 shows only one terminal, but this constitutes no limitation on this embodiment of the present invention. A quantity of terminals is not limited in this embodiment of the present invention.

Based on the system architectural diagram in FIG. 1, the server and the terminal are combined for training and using a prediction model. For example, terminals may use respective data of the terminals to train the prediction model and perform prediction on the terminals, and therefore do not upload privacy data of a user to the server. This protects user privacy. In addition, the terminals may feed back a prediction effect to the server, so that the server updates a model parameter based on prediction losses fed back by the plurality of terminals. In this way, the server also references information about the plurality of terminals, so that the model parameter is updated by using a large amount of user information.

In this embodiment of the present invention, after receiving a first model parameter and a second model parameter that are sent by the server, the terminal first updates the first model parameter based on a training set and the prediction model, to obtain an updated first model parameter; and inputs a target eigenvector used for prediction into a prediction model that uses the updated first model parameter and the second model parameter, to obtain a target sample label corresponding to the target eigenvector. In this way, a difference between the terminal and another terminal can be reflected, thereby achieving a more accurate prediction effect.

In an optional implementation solution of this embodiment of the present invention, the server uses a meta-learner to maintain the model parameter of the prediction model. Meta-learning is a two-level machine learning architecture that "re-learns" a learning result, and attempts to rectify incorrect classification and consolidate correct classification. Therefore, the meta-learner has relatively high precision. In this embodiment of the present invention, the meta-learner mode is used to update the model parameter. For example, in this prediction system architectural diagram, the server is configured to store and update the model parameter adapted to the prediction model, the terminal stores the prediction model corresponding to the model parameter, and training of the prediction model and prediction may be performed on the prediction model of the terminal by using the model parameter on the server.

It should be noted that a first training set or a second training set in this embodiment of the present invention is a label data set used for training the prediction model, and a test set is a label data set used for testing a model prediction capability. Label data is data including a correct label. In this embodiment of the present invention, a prediction loss of sample data can be understood as a deviation between a prediction result and an actual result. Herein, the prediction result is a prediction sample label that is obtained for an eigenvector by using the prediction model, and the actual result is a sample label to which the eigenvector should be corresponding.

The terminal in this embodiment of the present invention may be a device having a communication function. The terminal may be, for example, a handheld terminal device, a notebook computer, a subscriber unit, a cellular phone, a smartphone, a wireless data card, a personal digital assistant (PDA) computer, a tablet computer, a wireless modem, a handheld device, a laptop computer, a cordless phone a wireless local loop (WLL) station, or a machine type communication (MTC) terminal. For example, the terminal device may also be a portable, pocket-sized, handheld, computer built-in, or vehicle-mounted mobile apparatus. The server in this embodiment of the present invention may be a backend service device having processing and communication functions. No limitation is imposed on the terminal and the server in this embodiment of the present invention.

Embodiment 2

Figure 2:
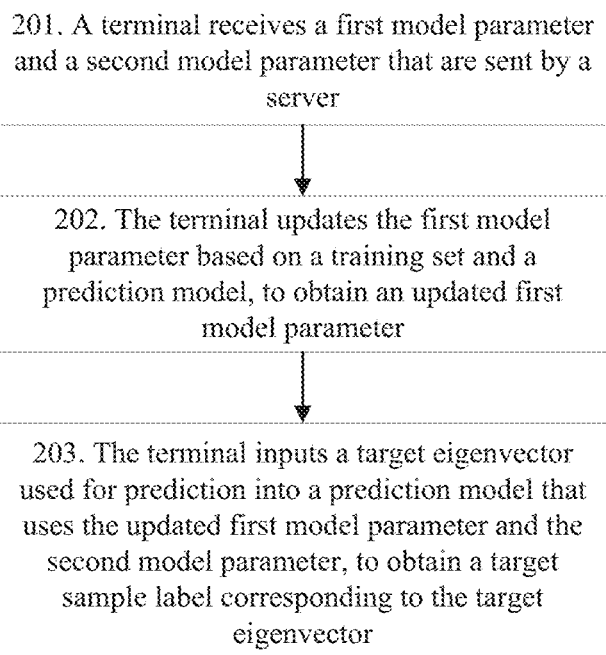
FIG. 2 shows a prediction method according to an embodiment of the present invention.

FIG. 2 shows a prediction method according to an embodiment of the present invention. The method is performed by a terminal. As shown in FIG. 2, the prediction method includes steps 201 to 203. For details, refer to the following specific descriptions.

201. The terminal receives a first model parameter and a second model parameter that are sent by a server.

In this embodiment of the present invention, the first model parameter and the second model parameter are adapted to a prediction model of the terminal. The prediction model includes a model parameter. In this embodiment of the present invention, the server may send the model parameter to the terminal. In addition, the model parameter may be updated at a model training stage or a model prediction stage, and the corresponding prediction model may also be updated to use an updated model parameter.

In this embodiment of the present invention, the server maintains a meta-learner using (θ,α) as parameters, where θ is the first model parameter, and α is the second model parameter. In this step, the first model parameter is represented by $\theta_1$, and the second model parameter is represented by $\alpha_1$. The server distributes values of ($\theta_1$, $\alpha_1$) as model parameters of the prediction model to a plurality of terminals. Herein, an entity for receiving the model parameters is any one of the plurality of terminals to which the model parameters are distributed.

For example, initialized parameters of the meta-learner on the server are (θ,α), where θ is an initial parameter of the prediction model, θ is a vector, each component included in θ is represented by $\theta_j$, and each $\theta_j$ may be randomly initialized in the following manner:

$$\theta_j \sim N\left(0, \frac{1}{m}\right) \text{ for each } j \text{ where } N\left(0, \frac{1}{m}\right)$$

represents a normal distribution whose expectation is 0 and whose variance is $$\frac{1}{m}.$$

α is a vector. Each component of α and each component of θ are in one-to-one correspondence (this is set herein because a vector subtraction operation needs to be performed for an update rule used in subsequent examples). Each component included in α is represented by $\alpha_j$, and is randomly initialized in the following manner:

$$\alpha_j \sim U(0, 0.1) \text{ for each } j$$

where U(0,0.1) is a uniform distribution within an interval [0,0.1].

It should be noted that this is only an example of the initialized parameters of the meta-learner on the server. In addition, no limitation is imposed on the first model parameter and the second model parameter in this embodiment of the present invention.

202. The terminal updates the first model parameter based on a training set and the prediction model, to obtain an updated first model parameter.

The training set includes a plurality of pieces of sample data, and each piece of sample data includes an eigenvector and a sample label corresponding to the eigenvector. To reflect a difference between terminals, the terminals may use respective data of the terminals as sample data. Step 202 may be specifically implemented by using the following steps A11 and A12.

A11. The terminal calculates an intermediate prediction loss of the training set based on the prediction model.

The training set herein includes a plurality of pieces of sample data, and each of the plurality of pieces of sample data includes a sample label and an eigenvector corresponding to the sample label. After the first model parameter is updated, model parameters used by the prediction model herein are the first model parameter and the second model parameter, namely, ($\theta_1$, $\alpha_1$).

In a first optional solution, the terminal first calculates a prediction loss of each of the plurality of pieces of sample data, and then calculates an average value of a plurality of prediction losses, to obtain the intermediate prediction loss. For example, $$L_1^{train}(\theta_1) = \frac{1}{M}\sum_{m=1}^{M} l_m(\theta_1)$$

where $L_1^{train}(\theta_1)$ represents the intermediate prediction loss of the training set that is determined based on the prediction model; the training set is $S_{train}(m)$, m represents the $m^{th}$ piece of sample data in the training set, and an amount of sample data in the training set is M; and $l_m(\theta_1)$ represents a prediction loss of the $m^{th}$ piece of sample data.

Alternatively, in a second optional solution, the terminal first calculates a prediction loss of each of the plurality of pieces of sample data, and then obtains a weight corresponding to each piece of sample data and calculates an average value of a plurality of prediction losses, to obtain the intermediate prediction loss. For example, $$L_1^{train}(\theta_1) = \frac{1}{M}\sum_{m=1}^{M} \lambda_m l_m(\theta_1)$$

where $L_1^{train}(\theta_1)$ represents the intermediate prediction loss determined based on the prediction model; the training set is $S_{train}(m)$, m represents the $m^{th}$ piece of sample data in the training set, and an amount of sample data in the training set is M; and $l_m(\theta_1)$ represents a prediction loss of the $m^{th}$ piece of sample data, and $\lambda_m$ represents a weight corresponding to the $m^{th}$ piece of sample data.

Optionally, the weight corresponding to each piece of sample data may be determined by the terminal based on association information of the sample data. For example, the weight is determined based on a generation moment of the sample data. An example is used for description in which the prediction model is used to recommend application software to a user. The training set is generated based on a historical usage record of the user, the sample label of the sample data may be a name of application software W, and the eigenvector is constituted based on characteristics such as a location, time, a mobile phone battery level, and network signal strength of the application software W. In this example, the terminal may sort, in descending order, duration from historical usage records to a current moment, classify the duration, and set a weight corresponding to each type of duration. For example, a weight value corresponding to duration during which a historical usage record is closer to the current moment is larger. In this embodiment of the present invention, because the sample data is related to the prediction model, no limitation is imposed on the association information of the sample data.

A12. The terminal updates the first model parameter based on the intermediate prediction loss and the second model parameter according to the parameter update rule, to obtain the updated first model parameter.

The parameter update rule is preset, or the parameter update rule may be changed. No limitation is imposed on the parameter update rule in this embodiment of the present invention.

For example, a small-sample learning algorithm is used, and the parameter update rule may be implemented according to the following formula:

$$\theta_2 = \theta_1 - \alpha_1 \circ \nabla_{\theta_1} L_1^{train}(\theta_1)$$

where $\theta^2$ represents the updated first model parameter; $\theta_1$ represents the first model parameter before the updating; $\alpha_1$ represents the second model parameter; $L_1^{train}(\theta_1)$ represents the calculated intermediate prediction loss of the training set $S_{train}$; $\nabla$ represents a gradient; and $\circ$ represents a component multiplication operation of a vector. $(a_1,a_2) \circ (b_1,b_2) = (a_1 b_1, a_2 b_2)$ is used as an example for the $\circ$ operation. $L_1^{train}(\theta_1)$ includes the variable $\theta_1$, and therefore the $\nabla$ operation can be used to derive $L_1^{train}(\theta_1)$ with respect to $\theta_1$, so as to obtain a change rate of $L_1^{train}(\theta_1)$ for $\theta_1$. The updated first model parameter $\theta_2$ can be obtained according to the foregoing update formula.

The second model parameter may be obtained on the server side through learning. After the second model parameter becomes more accurate through learning, accuracy of the updated first model parameter is further ensured.

For steps A11 and A12, in a possible solution, the terminal may perform step 202 according to a preset quantity of iterations. For example, the quantity of iterations is 100. To be specific, step 202 needs to be repeated 100 times according to steps A11 and A12. Details are as follows:

$\theta'_1 \leftarrow \theta_1$ // use $\theta_1$ to represent the first model parameter, and use $\theta'_i$ to represent a first model parameter before the iteration;

for t=1, 2, . . . , T do // iterate T times to optimize the local prediction model, where for example, T=100;

$$\mathcal{L}_i^{train}(\theta'_i) \leftarrow \frac{1}{|S_{train}|} \sum_{(x,k) \in S_{train}} \ell(f_{\theta'_i}(x), k)$$

// for the first step performed in a cycle, calculate the intermediate prediction loss, where $\mathcal{L}_1^{train}(\theta'_i)$ represents the intermediate prediction loss of the training set that is calculated based on $\theta'_i$; and $\ell(f_{\theta'_i}(x),k)$ represents the prediction loss corresponding to each piece of sample data in the training set; and $\theta'_i \leftarrow \theta'_i - \alpha \circ \nabla_{\theta'_i} \mathcal{L}_i^{train}(\theta'_i)$ // for the second step performed in the cycle, update the first model parameter in the iteration; in other words, in a next iteration process, use the updated first model parameter in the current iteration to perform step 202.

In this way, the updated first model parameter becomes more accurate through a plurality of iterations. Herein, a quantity of prediction iterations is used to implement a plurality of times of updating the first model parameter. In an optional solution, in two neighboring iterations, a difference between an intermediate prediction loss obtained in a previous iteration and an intermediate prediction loss obtained in a current iteration may be determined. If the difference is less than a preset threshold, no more iterations are performed, and a first model parameter calculated based on the intermediate prediction loss obtained in the current iteration is used. In another optional solution, in two neighboring iterations, a difference between a first model parameter updated in a previous iteration and a first model parameter updated in a current iteration may be determined. If the difference is less than a preset threshold, no more iterations are performed, and the first model parameter updated in the current iteration is determined as the updated first model parameter. This is only an example for description. No limitation is imposed on the quantity of iterations of steps A11 and A12 and the condition for stopping an iteration in this embodiment of the present invention.

Further, for a manner of calculating the prediction loss corresponding to each piece of sample data in step A11, refer to detailed descriptions of steps B11 and B12.

B11. The terminal inputs the eigenvector of each piece of sample data into the prediction model, to obtain a probability that the eigenvector of each piece of sample data is corresponding to the sample label.

Step B11 is performed before updating of the first model parameter, and therefore the prediction model herein still uses the first model parameter and the second model parameter.

During specific implementation, the prediction model includes a plurality of reference sample labels, and the plurality of reference sample labels include the sample label corresponding to each piece of sample data. In other words, because the training set has included the sample label corresponding to the eigenvector, the plurality of reference sample labels included in the prediction model should include at least the sample label included in the training set, so that the prediction model can be accurately trained.

Further, in the prediction model, according to a probability calculation rule using the first model parameter, a probability that the eigenvector is corresponding to each reference sample label may be calculated; and a corresponding probability when the reference sample label is the sample label is obtained.

An example is used for description in which the prediction model is used to recommend application software to a user. The plurality of reference sample labels include application names P1, P2, P8, P9, P10, P3. P4, P5, P6, and P7; the sample labels include application names P1, P2, P3, P4, P5, and P6, and eigenvectors respectively corresponding to the sample labels are x1, x2, x3, x4, x5, and x6. The probability calculation rule using the first model parameter is $f_{\theta_1}(x)$. According to this probability calculation rule, when a value x that is any one of the eigenvectors is input, probability values indicating that the eigenvector is corresponding to the plurality of reference sample labels are obtained.

For example, $f_{\theta_1}(x^3)$ represents results obtained by inputting the eigenvector x3. The results include probability values indicating that the eigenvector x3 is corresponding to P1, P2, P8. P9, P10, P3, P4, P5, P6, and P7. The eigenvector x3 is corresponding to the sample label P3, and therefore a result corresponding to the reference sample label P3 is found from the results, as a probability that the eigenvector x3 is corresponding to the sample label P3.

B12. The terminal calculates, based on the probability that the eigenvector is corresponding to the sample label, the prediction loss of each piece of sample data according to a loss calculation rule.

During implementation, the loss calculation rule is $l(f_{\theta_1}(x),k) = -\log(f_{\theta_1}(x))_k$, where x is the eigenvector, k represents the $k^{th}$ reference sample label, in the plurality of reference sample labels, that is the sample label corresponding to the eigenvector, $(f_{\theta_1}(x))_k$ represents the probability that the eigenvector is corresponding to the sample label, and $l(f_{\theta_1}(x),k)$ represents the prediction loss corresponding to the sample data.

For better understanding, the following uses a simple linear model (the linear model herein is only an example, and a more complex model such as a deep neural network may alternatively be used) as an example for describing a correlation between the probability calculation rule and the first model parameter. Assuming that the input eigenvector is $x \in R^m$, where m is a dimension of the eigenvector, and the first model parameter of the prediction model is $\theta_1$, an output $f_{\theta_1}(x)$ of the model is defined as:

$$f_{\theta_1}(x) = \sigma(\omega \cdot x + b)$$

where $\theta = (\omega, b)$, that is, $\omega \in R^{K \times m}$ and $b \in R^K$ are the first model parameter of the prediction model; and $\sigma$ is a Softmax function and is defined as:

$$\sigma(z)_k = \frac{e^{z_k}}{\sum_{j=1}^{K} e^{z_j}}$$

for $z \in R^K$, k=1, 2, . . . , K

The output $f_{\theta_1}(x)$ of the model is a probability distribution, where the $k^{th}$ component, that is, $(f_{\theta_1}(x))_k$, represents a probability that the sample label is the $k$-th APP. Herein, K is a total quantity of output APPs.

203. The terminal inputs a target eigenvector used for prediction into a prediction model that uses the updated first model parameter and the second model parameter, to obtain a target sample label corresponding to the target eigenvector.

During specific implementation, when the prediction model including the updated first model parameter and the second model parameter is used for prediction, the terminal inputs the target eigenvector used for prediction into the updated prediction model. According to the foregoing description, the prediction model includes a plurality of reference sample labels, and therefore a reference probability that the target eigenvector is corresponding to each reference sample label is obtained. The terminal determines a reference sample label corresponding to a maximum reference probability value among a plurality of reference probabilities, as the target sample label.

Figure 4:
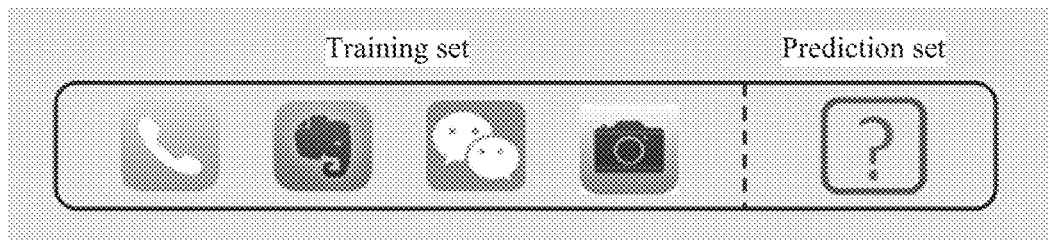

An example is used for description in which the prediction model is used to recommend application software to a user. For ease of understanding, refer to FIG. 4. FIG. 4 is an example diagram of a prediction model used to recommend application software to a user according to an embodiment of the present invention. As shown in FIG. 4, a training set includes icons of four applications, and a prediction set represents an icon of a next recommended application to be predicted. The icon of each application in the training set further includes an eigenvector corresponding to the application, and the eigenvector is constituted based on characteristics such as a location, time, a mobile phone battery level, and network signal strength of the application software W. When there are 20 application names for reference, a prediction result for the target eigenvector is an application name corresponding to a corresponding largest $(f_{\theta_1}(x))_k$ value among the 20 APPs.

In this embodiment of the present invention, after receiving the first model parameter and the second model parameter that are sent by the server, the terminal first updates the first model parameter based on the training set and the prediction model, to obtain the updated first model parameter, and inputs the target eigenvector used for prediction into the prediction model that uses the updated first model parameter and the second model parameter, to obtain the target sample label corresponding to the target eigenvector. In this way, a difference between the terminal and another terminal can be reflected, thereby achieving a more accurate prediction effect.

Embodiment 3

Figure 3:
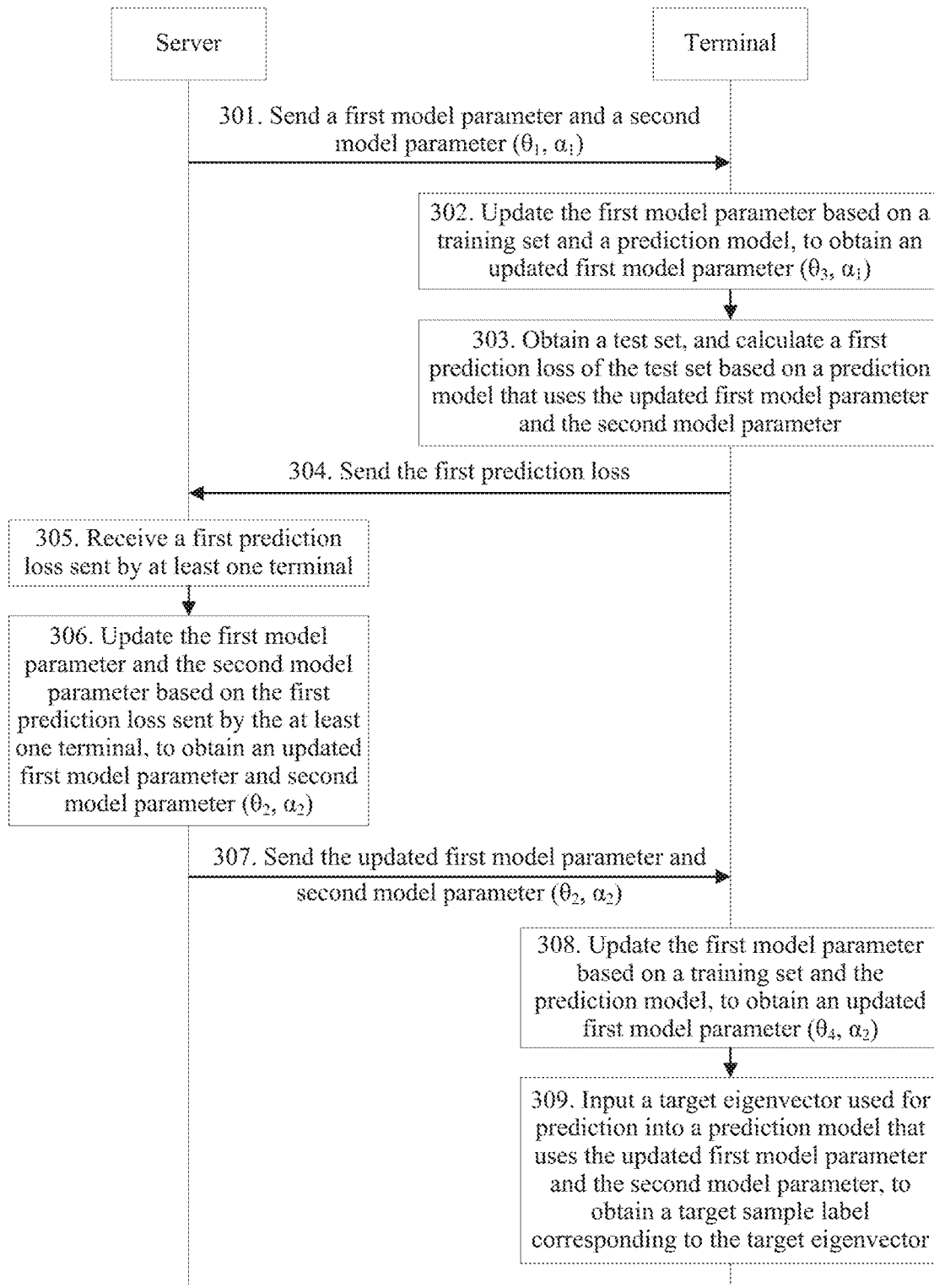
FIG. 3 shows another prediction method according to an embodiment of the present invention FIG. 4 provides an example diagram of a prediction system for recommending application software to a user.

Based on the system architectural diagram shown in FIG. 1, FIG. 3 shows another prediction method according to an embodiment of the present invention. The method is performed by at least two terminals and a server together. Herein, an interaction procedure between only one of the terminals and the server is depicted. For an interaction procedure between the other terminals and the server, refer to detailed descriptions of this terminal. As shown in FIG. 3, the prediction method includes steps 301 to 309. For details, refer to the following specific descriptions.

301. The server sends a first model parameter and a second model parameter to a plurality of terminals.

In this embodiment of the present invention, the first model parameter and the second model parameter are adapted to a prediction model of the terminal. The prediction model includes a model parameter. In this embodiment of the present invention, the server may send the model parameter to the terminal. In addition, the model parameter may be updated at a model training stage or a model prediction stage, and the corresponding prediction model may also be updated to use an updated model parameter.

In this embodiment of the present invention, the server maintains a meta-learner using $(\theta, \alpha)$ as parameters, where $\theta$ is the first model parameter, and $\alpha$ is the second model parameter. In this step, the first model parameter is represented by $\theta_1$, and the second model parameter is represented by $\alpha_1$. The server distributes values of $(\theta_1, \alpha_1)$ as model parameters of the prediction model to the plurality of terminals. Herein, an entity for receiving the model parameters is any one of the plurality of terminals to which the model parameters are distributed.

For example, initialized parameters of the meta-learner on the server are $(\theta, \alpha)$, where $\theta$ is an initial parameter of the prediction model, $\theta$ is a vector, each component included in $\theta$ is represented by $\theta_j$, and each $\theta_j$ may be randomly initialized in the following manner:

$$\theta_j \sim N\left(0, \frac{1}{m}\right) \text{ for each } j \text{ when } N\left(0, \frac{1}{m}\right)$$

represents a normal distribution whose expectation is 0 and whose variance is $$\frac{1}{m}.$$

$\alpha$ is a vector. Each component of $\alpha$ and each component of $\theta$ are in one-to-one correspondence (this is set herein because a vector subtraction operation needs to be performed for an update rule used in subsequent examples). Each component included in $\alpha$ is represented by $\alpha_j$, and is randomly initialized in the following manner:

$$\alpha_j \sim U(0,0.1) \text{ for each } j$$

where $U(0,0.1)$ is a uniform distribution within an interval [0,0.1].

It should be noted that this is only an example of the initialized parameters of the meta-learner on the server. In addition, no limitation is imposed on the first model parameter and the second model parameter in this embodiment of the present invention.

Correspondingly, each of the plurality of terminals stores a prediction model, and the prediction models stored in the plurality of terminals are based on a same type. For example, the prediction models are prediction models that are based on a same algorithm and that are used to tackle one prediction task. The corresponding first model parameter and the corresponding second model parameter that are sent by the server and that are received by each terminal are adapted to the prediction model of the terminal.

302. The terminal updates the first model parameter based on a first training set and the prediction model, to obtain an updated first model parameter.

In this embodiment of the present invention, there is another training set, and the another training set and the first training set are at different stages. Therefore, the first training set is used herein to be differentiated from a second training set. The first training set herein includes a plurality of pieces of first sample data, and the first sample data includes a first eigenvector and a first sample label corresponding to the first eigenvector.

Step 302 is specifically: calculating a second prediction loss of the training set based on the prediction model, where the prediction model uses the first model parameter and the second model parameter, namely, $(\theta_1, \alpha_1)$; and then updating the first model parameter based on the second prediction loss and the second model parameter according to the parameter update rule, to obtain the updated first model parameter. For specific implementation, refer to detailed descriptions of step 202 in the embodiment shown in FIG. 2. A difference between step 202 and step 302 lies in: In step 302, the second training set is used, whereas in step 202, the training set is used correspondingly; and in step 302, the second prediction loss is used, whereas in step 202, the intermediate prediction loss is used correspondingly. This is because the embodiment shown in FIG. 2 is at a stage of prediction performed by using the prediction model, and step 302 in the embodiment shown in FIG. 3 is at a stage of training the prediction models by terminals by using respective data of the terminals. Although step 202 and step 302 are at different stages, their implementations are the same. Details are not described herein again.

303. The terminal obtains a test set, and calculates a first prediction loss of the test set based on a prediction model that uses the updated first model parameter and the second model parameter.

The test set includes a plurality of pieces of second sample data, and the second sample data includes a second eigenvector and a second sample label corresponding to the second eigenvector. The prediction model herein has used the updated first model parameter. Assuming that the updated first model parameter is $\theta_3$, model parameters used by the prediction model are $(\theta_3, \alpha 1)$.

The test set includes the plurality of pieces of second sample data, and each of the plurality of pieces of second sample data includes the second sample label and the second eigenvector corresponding to the second sample label.

In a first optional solution, the terminal first calculates a prediction loss of each of the plurality of pieces of second sample data, and then calculates an average value of a plurality of prediction losses, to obtain the first prediction loss. For example, $$L_{i2}^{test}(\theta_3) = \frac{1}{N}\sum_{n=1}^{N} l_n(\theta_3)$$

where $\Theta_3$ represents the updated first model parameter; $L_{i2}^{test}(\theta_3)$ represents the first prediction loss determined by a terminal i based on the updated first model parameter; the test set is $S_{test}(n)$, n represents the $n^{th}$ piece of second sample data in the test set, and an amount of second sample data in the test set is N; and $l_n(\theta_3)$ represents a prediction loss of the $n_{th}$ piece of second sample data.

Alternatively, in a second optional solution, the terminal first calculates a prediction loss of each of the plurality of pieces of second sample data, and then obtains a weight corresponding to each piece of second sample data and calculates an average value of a plurality of prediction losses, to obtain the first prediction loss. For example, $$L_{i2}^{test}(\theta_3) = \frac{1}{N}\sum_{n=1}^{N} \lambda_n l_n(\theta_3)$$

where $\theta_3$ represents the updated first model parameter; $L_{i2}^{test}(\theta_3)$ represents the first prediction loss determined by a terminal i based on the updated first model parameter; the test set is $S_{test}(n)$, n represents the $n^{th}$ piece of second sample data in the test set, and an amount of second sample data in the test set is N; and $l_n(\theta_3)$ represents a prediction loss of the $n^{th}$ piece of second sample data, and $\lambda_n$ represents a weight corresponding to the $n^{th}$ piece of second sample data.

Optionally, the weight corresponding to each piece of second sample data may be determined by the terminal based on association information of the second sample data. For example, the weight is determined based on a generation moment of the second sample data. An example is used for description in which the prediction model is used to recommend application software to a user. The second sample data is generated based on a historical usage record of the user. To be specific, the second sample label of the second sample data may be a name of application software W. and the eigenvector is constituted based on characteristics such as a location, time, a mobile phone battery level, and network signal strength of the application software W. In this example, the terminal may sort, in descending order, duration from historical usage records to a current moment, classify the duration, and set a weight corresponding to each type of duration. For example, a weight value corresponding to duration during which a historical usage record is closer to the current moment is larger. In this embodiment of the present invention, because the second sample data is related to the prediction model, no limitation is imposed on the association information of the second sample data.

Further, for a manner of calculating the prediction loss corresponding to each piece of second sample data in step 303, refer to detailed descriptions of steps B11 and B12 in the embodiment shown in FIG. 2. Details are not described herein again.

304. The terminal sends the first prediction loss to the server.

After determining the first prediction loss in step 303, the terminal sends the first prediction loss to the server, so that the server updates the prediction model based on the first prediction loss and a first prediction loss sent by another terminal, to obtain updated model parameters.

305. The server receives a first prediction loss sent by at least one of the plurality of terminals.

The server receives the first prediction loss sent by the at least one of the plurality of terminals. Herein, values of the first prediction losses fed back by the terminals are unnecessarily the same. This is because the first prediction loss sent by each terminal is calculated by the terminal based on the first model parameter and the second model parameter in this embodiment of the present invention.

306. The server updates the first model parameter based on the first prediction loss sent by the at least one terminal, to obtain an updated first model parameter, and updates the second model parameter based on the first prediction loss sent by the at least one terminal, to obtain an updated second model parameter.

The server updates the first model parameter and the second model parameter based on the first prediction loss fed back by the at least one terminal. For a specific implementation process, refer to the following detailed description of steps C11 and C12.

C11. The server calculates the second prediction loss based on the first prediction loss sent by the at least one terminal. In an optional solution, the server determines an average value of a plurality of first prediction losses as the second prediction loss. In another optional solution, the server may obtain a weight corresponding to the first prediction loss of each terminal, and obtain the second prediction loss in a weighted averaging operation manner.

For example, the server calculates the second prediction loss in the following manner. It should be noted that the second prediction loss herein is different from the second prediction loss in step 302. This is because the second prediction loss in step 302 is determined by the terminal whereas the second prediction loss herein is determined by the server, and two calculation manners are also different. The calculation manner herein is as follows:

$$L_3(\theta_3) = \frac{1}{Q}\sum_{i=1}^{Q} L_{i2}^{test}(\theta_3)$$

where Q represents a quantity of the at least one terminal; $L_{i2}^{test}(\theta_3)$ represents a first prediction loss calculated by the terminal i based on $\Theta_3$ in step 304; and $L_3(\theta_3)$ represents the second prediction loss.

C12. The server updates the first model parameter based on the second prediction loss according to a parameter update rule, to obtain the updated first model parameter, and updates the second model parameter based on the second prediction loss according to the parameter update rule, to obtain the updated second model parameter.

It should also be noted that the parameter update rule herein is different from the parameter update rule in step 302. Optionally, the parameter update rule herein may be preset. No limitation is imposed on the parameter update rule in this embodiment of the present invention.

For example, the parameter update rule may be implemented according to the following formula:

$$\theta_2 = \theta_1 - \beta \nabla_{\theta_1} L_3(\theta_1)$$

where $\theta_1$ represents the first model parameter; $\theta_2$ represents the updated first model parameter; $\beta$ represents a first preset weight; $L_3(\theta_3)$ is calculated based on the received first prediction loss and $\theta_3$ is also obtained by updating $\theta_1$ and therefore $L_3(\theta_3)$ can also be converted into a term including the variable $\theta_1$, namely, $L_3(\theta_1)$; and the $\nabla$ operation can be used to derive $L_3(\theta_1)$ with respect to $\theta_1$, so as to obtain a change rate of $L_3(\theta_1)$ for $\theta_1$. The updated first model parameter $\theta_2$ can be obtained according to the foregoing update formula.

The second model parameter may be learned or updated in the following manner. Specifically, the server updates the second model parameter based on the first prediction loss according to the parameter update rule, to obtain the updated second model parameter.

For example, the parameter update rule is:

$$\alpha_2 = \alpha_1 - \gamma \nabla_{\alpha_1} L_3(\theta_1, \alpha_1)$$

where $\alpha_1$ represents the second model parameter; $\theta_2$ represents the updated second model parameter; $\gamma$ represents a second preset weight; $L_3(\theta_1, \alpha_1)$ represents the second prediction loss calculated based on the first prediction loss sent by each terminal; $L_3(\theta_3)$ is calculated based on the received first prediction loss, $\theta_3$ is also obtained by updating $\theta_1$, and $\alpha_1$ is also included in an updating process of $\theta_3$, and therefore $L_3(\theta_3)$ can also be converted into a term including the variable $\theta_1$ and the variable $\alpha_1$, namely, $L_3(\theta_1, \theta_1)$; and $\nabla$ represents a gradient. Herein, variables are further added.

Optionally, no limitation is imposed on $\beta$ and $\gamma$ in this embodiment of the present invention. Values of $\beta$ and $\gamma$ may be identical or different.

307. The server sends the updated first model parameter and the updated second model parameter to the plurality of terminals.

It can be learned from step 306 that the updated first model parameter is $\theta_2$ and that the updated second model parameter is $\alpha_2$. Therefore, in this case, model parameters that are adapted to the prediction model of the terminal and that are sent by the server are $(\theta_2, \alpha_2)$.

Correspondingly, the terminal receives the updated first model parameter and the updated second model parameter that are sent by the server, to perform prediction based on the updated first model parameter and the updated second model parameter.

308. The terminal updates the first model parameter based on the second training set, to obtain an updated first model parameter.

309. The terminal inputs a target eigenvector used for prediction into a prediction model that uses the updated first model parameter and the second model parameter, to obtain a target sample label corresponding to the target eigenvector.

For steps 308 and 309, refer to detailed descriptions of steps 202 and 203 in the embodiment shown in FIG. 2. Details are not described herein again. It should be noted that in step 308, the model parameters of the prediction model are $(\theta_2, \alpha_2)$ before the first model parameter is updated, and the updated first model parameter may be represented by $\theta_4$. A specific updating process is not described herein again.

In an optional embodiment, sending the model parameters of the prediction model by the server to at least two terminals in this embodiment of the present invention may be performed according to a particular rule. For example, the at least two terminals are E terminals, and the server may centrally distribute the model parameters to the E terminals at a fixed time; or the server sends the model parameters of the prediction model to the E terminals when the meta-learner of the prediction model needs to be updated; or the E terminals are classified into F types of terminals, and the server sends information about the prediction model and the like to the F types of terminals in batches. No limitation is imposed on the rule according to which the server sends the model parameters of the prediction model in this embodiment of the present invention.

In an optional embodiment, in this embodiment of the present invention, sending the prediction loss by the terminal to the server may also be performed according to a particular rule. For example, the server sends, to each of the at least two terminals, a time point for feeding back the prediction loss, and all the terminals may feed back the prediction loss at this time point, to obtain the prediction losses centrally; or the terminals may feed back the prediction losses at different time points, to obtain the prediction losses in batches. For another example, the terminal may feed back the prediction loss depending on a model training status of the terminal. For example, after calculating the prediction loss, the terminal feeds back the prediction loss and the like to the server within particular duration. No limitation is imposed on the rule according to which the terminal feeds back the prediction loss in this embodiment of the present invention.

In this embodiment of the present invention, the prediction model may be trained on each terminal, so that user privacy of each terminal can be protected; and the terminal feeds back the calculated prediction loss to the server, so that the server updates the model parameters based on a large amount of data fed back by the terminal. In this way, the parameters of the prediction model can be accurately updated by using a large amount of user information. In addition, the server may send the model parameters that are adapted to the prediction model of the terminal to the terminal, so that the terminal implements prediction. After receiving the model parameters sent by the server, the terminal first updates the first model parameter based on the training set and the prediction model, to obtain the updated first model parameter; inputs the target eigenvector used for prediction into the prediction model that uses the updated first model parameter; and obtains the target sample label corresponding to the target eigenvector. In this way, a difference between the terminal and another terminal can be reflected, thereby achieving a more accurate prediction effect.

Figure 5:
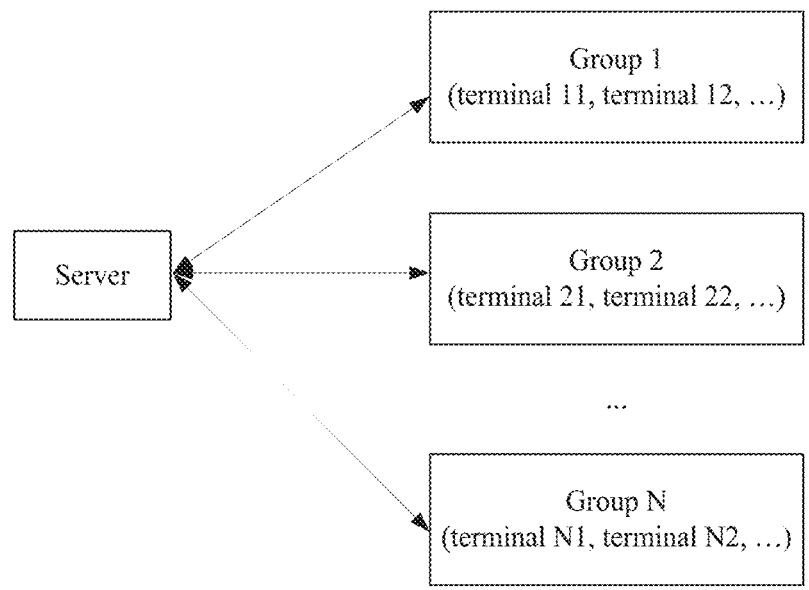
FIG. 5 is an example diagram of a prediction method according to an embodiment of the present invention.

Then, the following describes another scenario to which this embodiment of the present invention can be applied. FIG. 5 is an example diagram of a prediction method according to an embodiment of the present invention. As shown in FIG. 5, a server and a plurality of groups are included, and each group includes at least two terminals. For example, a group I includes a terminal 11, a terminal 12, and the like. In this scenario, the server may group a plurality of terminals according to a particular rule, so that at least two terminals included in each group have a common characteristic. For example, that at least two terminals have a common characteristic includes: Locations of these terminals are within a particular geographical area, and these terminals have similar information related to the prediction model. For example, for a prediction system for recommending application software to a user, the information related to the prediction model may include a type of an application downloaded on the terminal, duration for which the user uses the terminal, a usage habit of the user, an age range of the user, and the like. Optionally, in consideration of protecting user privacy information, grouping may be performed based on a terminal identifier. The terminal identifier herein may include a hardware identifier, Internet protocol (IP), and the like. This is not limited in this embodiment of the present invention.

In the scenario shown in FIG. 5, the server may manage each group separately. In other words, one group is corresponding to one prediction model. For example, steps in the embodiment shown in FIG. 3 are performed on the terminal 11, the terminal 12, and the like in the group 1, and information fed back by terminals in another group is not referenced in this process. Because terminal users belonging to a same group have more commonality, a corresponding meta-learner can be more targeted for learning a mechanism suitable for the group. In this way, a prediction model more suitable for the terminals in the group can be obtained through training, thereby achieving a better prediction effect.

Embodiment 4

Figure 6:
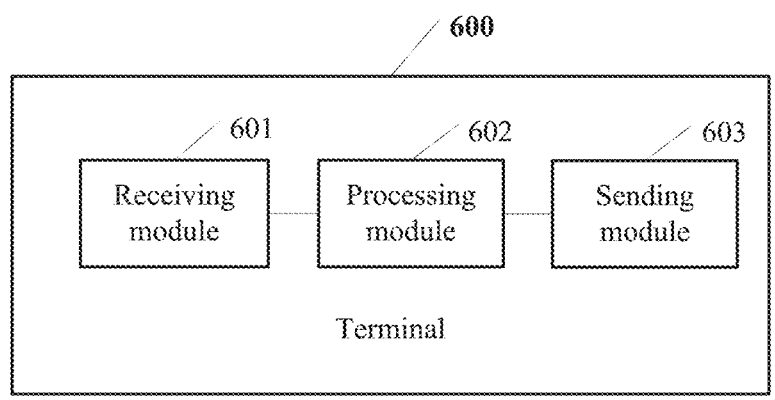
FIG. 6 is a schematic structural diagram of a terminal according to an embodiment of the present invention.

FIG. 6 is a schematic structural diagram of a terminal according to an embodiment of this application. The terminal 60X) in FIG. 6 includes:

a receiving module 601, configured to receive a first model parameter and a second model parameter that are sent by the server, where the first model parameter and the second model parameter are adapted to a prediction model of the terminal:

a processing module 602, configured to update the first model parameter based on a training set and the prediction model, to obtain an updated first model parameter, where the training set includes a plurality of pieces of first sample data, and the first sample data includes a first eigenvector and a first sample label corresponding to the first eigenvector;

the processing module 602 is specifically configured to: obtain a test set, and calculate a first prediction loss of the test set based on a prediction model that uses the updated first model parameter, where the test set includes a plurality of pieces of second sample data, and the second sample data includes a second eigenvector and a second sample label corresponding to the second eigenvector; and a sending module 603, configured to send the first prediction loss to the server, so that the server updates the first model parameter and the second model parameter based on the first prediction loss.

The terminal includes the prediction model used for prediction. The prediction model included in the terminal and a prediction model on the server are prediction models of a same type.

In an optional embodiment, the aspect of updating, by the processing module 602, the first model parameter based on a training set and the prediction model, to obtain an updated first model parameter specifically includes:

calculating a second prediction loss of the training set based on the prediction model, where the prediction model uses the first model parameter and the second model parameter; and updating the first model parameter based on the second prediction loss and the second model parameter according to a parameter update rule, to obtain the updated first model parameter.

In an optional embodiment, the aspect of calculating, by the processing module 602, a second prediction loss of the training set based on the prediction model specifically includes:

calculating, based on the prediction model, a prediction loss corresponding to each of the plurality of pieces of first sample data; and calculating the second prediction loss of the plurality of pieces of first sample data based on the prediction loss corresponding to each piece of first sample data.

In an optional embodiment, the aspect of calculating, by the processing module 602 based on the prediction model, a prediction loss of each of the plurality of pieces of first sample data specifically includes:

inputting the first eigenvector of each piece of first sample data into the prediction model, to obtain a probability that the first eigenvector of each piece of first sample data is corresponding to the first sample label; and calculating, based on the probability that the first eigenvector is corresponding to the first sample label, the prediction loss of each piece of first sample data according to a loss calculation rule.

In an optional embodiment, the aspect of inputting, by the processing module 602, the first eigenvector of each piece of first sample data into the prediction model, to obtain a probability that the first eigenvector of each piece of first sample data is corresponding to the first sample label specifically includes:

obtaining a plurality of reference sample labels included in the prediction model, where the plurality of reference sample labels include all the first sample labels;

inputting the first eigenvector of each piece of first sample data into the prediction model, to obtain a probability that the first eigenvector is corresponding to each reference sample label; and determining a corresponding probability when the reference sample label is the first sample label, as the probability that the first eigenvector is corresponding to the first sample label.

In an optional embodiment, the aspect of calculating, by the processing module 602, a first prediction loss of the test set based on a prediction model that uses the updated first model parameter and the second model parameter specifically includes:

calculating, based on the prediction model obtained after the model parameter updating, a prediction loss corresponding to each of the plurality of pieces of second sample data that are included in the test set, where the prediction model obtained after the model parameter updating uses the updated first model parameter and the second model parameter; and calculating the first prediction loss of the test set based on the prediction loss corresponding to each piece of second sample data.

In an optional embodiment, the aspect of calculating, by the processing module 602 based on the prediction model obtained after the model parameter updating, a prediction loss corresponding to each of the plurality of pieces of second sample data that are included in the test set specifically includes:

inputting the second eigenvector of each piece of second sample data into the prediction model obtained after the model parameter updating, to obtain a probability that the second eigenvector of each piece of second sample data is corresponding to the second sample label; and calculating, based on the probability that the second eigenvector is corresponding to the second sample label, the prediction loss of each piece of second sample data according to the loss calculation rule.

In an optional embodiment, the aspect of inputting, by the processing module 602, the second eigenvector of each piece of second sample data into the prediction model obtained after the model parameter updating, to obtain a probability that the second eigenvector of each piece of second sample data is corresponding to the second sample label specifically includes:

obtaining a plurality of reference sample labels included in the prediction model obtained after the model parameter updating, where the plurality of reference sample labels include all the second sample labels;

inputting the second eigenvector of each piece of second sample data into the prediction model obtained after the model parameter updating, to obtain a probability that the second eigenvector is corresponding to each reference sample label; and determining a corresponding probability when the reference sample label is the second sample label, as the probability that the second eigenvector is corresponding to the second sample label.

It can be understood that for specific implementations of function blocks included in the terminal and corresponding beneficial effects in this feasible solution, refer to specific descriptions of the foregoing embodiments shown in FIG. 2 to FIG. 5. Details are not described herein again.

Figure 7:
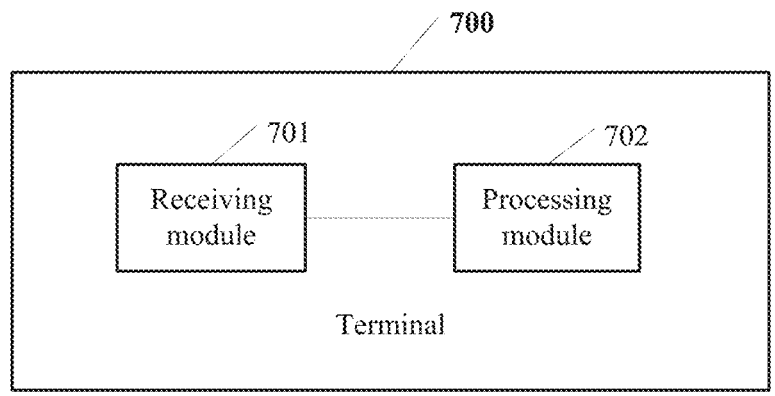
FIG. 7 is a schematic structural diagram of a terminal according to an embodiment of the present invention.

FIG. 7 is a schematic structural diagram of a terminal according to an embodiment of this application. The terminal 700 in FIG. 7 includes:

a receiving module 701, configured to receive a first model parameter and a second model parameter that are sent by a server, where the first model parameter and the second model parameter are adapted to a prediction model of the terminal; and a processing module 702, configured to update the first model parameter based on a training set and the prediction model, to obtain an updated first model parameter, where the training set includes a plurality of pieces of sample data, and each piece of sample data includes an eigenvector and a sample label corresponding to the eigenvector; and the processing module 702 is further configured to input a target eigenvector used for prediction into a prediction model that uses the updated first model parameter and the second model parameter, to obtain a target sample label corresponding to the target eigenvector.

The prediction model included in the terminal and a prediction model on the server are prediction models of a same type.

In an optional embodiment, the aspect of updating, by the processing module 702, the first model parameter based on a training set and the prediction model, to obtain an updated first model parameter specifically includes:

calculating an intermediate prediction loss of the training set based on the prediction model, where the prediction model uses the first model parameter and the second model parameter; and updating the first model parameter based on the intermediate prediction loss and the second model parameter according to a parameter update rule, to obtain the updated first model parameter.

In an optional embodiment, the aspect of calculating, by the processing module 702, an intermediate prediction loss of the training set based on the prediction model specifically includes:

calculating, based on the prediction model, a prediction loss corresponding to each of the plurality of pieces of sample data; and calculating the intermediate prediction loss of the plurality of pieces of sample data based on the prediction loss corresponding to each piece of sample data.

In an optional embodiment, the aspect of calculating, by the processing module 702, a prediction loss of each of the plurality of pieces of sample data based on the prediction model specifically includes:

inputting the eigenvector of each piece of sample data into the prediction model, to obtain a probability that the eigenvector of each piece of sample data is corresponding to the sample label, where the prediction model uses the first model parameter and the second model parameter; and calculating, based on the probability that the eigenvector is corresponding to the sample label, the prediction loss of each piece of sample data according to a loss calculation rule.

In an optional embodiment, the aspect of inputting, by the processing module 702, the eigenvector of each piece of sample data into the prediction model, to obtain a probability that the eigenvector of each piece of sample data is corresponding to the sample label specifically includes:

obtaining a plurality of reference sample labels included in the prediction model, where the plurality of reference sample labels include all the sample labels, where the prediction model uses the first model parameter and the second model parameter;

inputting the eigenvector of each piece of sample data into the prediction model, to obtain a probability that the eigenvector is corresponding to each reference sample label; and determining a corresponding probability when the reference sample label is the sample label, as the probability that the eigenvector is corresponding to the sample label.

In an optional embodiment, the aspect of inputting, by the processing module 702, a target eigenvector used for prediction into a prediction model that uses the updated first model parameter and the second model parameter, to obtain a target sample label corresponding to the target eigenvector specifically includes:

obtaining a plurality of reference sample labels included in the prediction model obtained after the model parameter updating, where the prediction model obtained after the model parameter updating uses the updated first model parameter and the second model parameter;

inputting the target eigenvector used for prediction into the prediction model obtained after the model parameter updating, to obtain a reference probability that the target eigenvector used for prediction is corresponding to each reference sample label; and determining a reference sample label corresponding to a maximum reference probability value among a plurality of reference probabilities, as the target sample label.

It can be understood that for specific implementations of function blocks included in the terminal and corresponding beneficial effects in this feasible solution, refer to specific descriptions of the foregoing embodiments shown in FIG. 2 to FIG. 5. Details are not described herein again.

Figure 8:
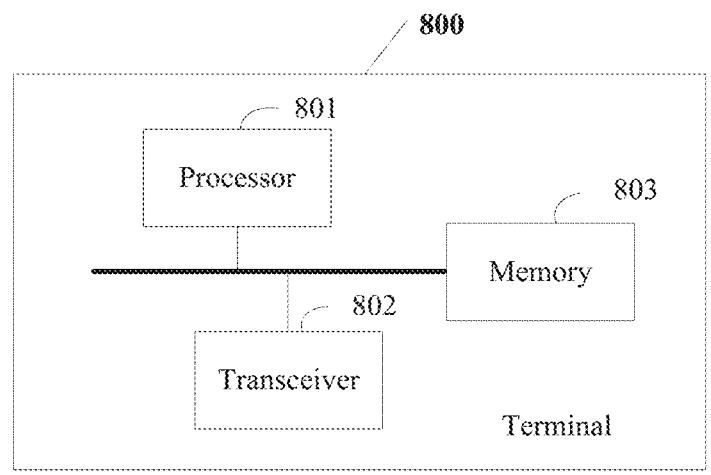
FIG. 8 is a schematic structural diagram of a terminal according to an embodiment of the present invention.

The terminal in the embodiments shown in FIG. 6 and FIG. 7 may be implemented by a terminal 800 shown in FIG. 8. FIG. 8 is a schematic structural diagram of another terminal according to an embodiment of the present invention. The terminal 800 shown in FIG. 8 includes a processor 801 and a transceiver 802. The transceiver 802 is configured to support information transmission between the terminal 800 and the server in the foregoing embodiments, for example, implement functions of the receiving module 601 and the sending module 603 in the embodiment shown in FIG. 6, or implement functions of the receiving module 701 in the embodiment shown in FIG. 7. The processor 801 and the transceiver 802 are communicatively connected, for example, connected through a bus. The terminal 800 may further include a memory 803. The memory 803 is configured to store program code and data that are to be executed by the terminal 800. The processor 801 is configured to execute the application program code stored in the memory 803, to implement actions of the terminal provided in any embodiment shown in FIG. 2 or FIG. 5.

It should be noted that in actual application, the terminal may include one or more processors, and the structure of the terminal 800 constitutes no limitation on this embodiment of this application.

The processor 801 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 803 may include a volatile memory, for example, a random access memory (RAM). The memory 803 may alternatively include a non-volatile memory, for example, a read-only memory (ROM), a flash memory, a hard disk drive (HDD), or a solid-state drive (SSD). The memory 803 may alternatively include a combination of the foregoing types of memories.

An embodiment of the present invention further provides a computer storage medium that may be configured to store a computer software instruction used by the terminal in the embodiment shown in FIG. 8. The computer software instruction includes a program designed for the terminal to implement the foregoing embodiment. The storage medium includes but is not limited to a flash memory, a hard disk drive, and a solid-state drive.

An embodiment of the present invention further provides a computer program product. When the computer product is run by a computing device, the prediction method designed for the terminal in the embodiment shown in FIG. 8 can be performed.

Embodiment 5

Figure 9:
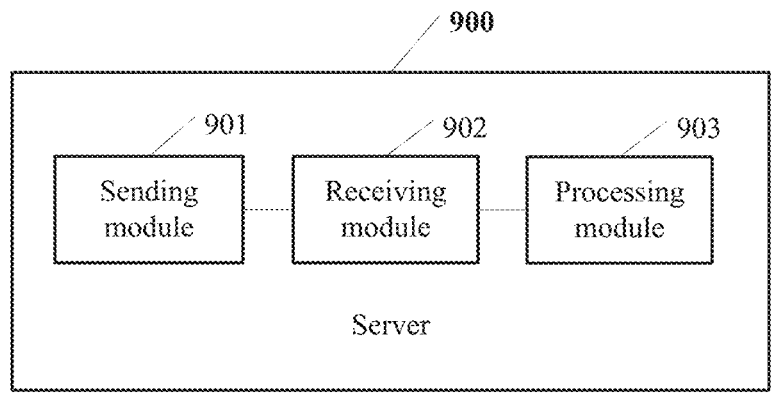
FIG. 9 is a schematic structural diagram of a server according to an embodiment of the present invention.

FIG. 9 is a schematic structural diagram of a server according to an embodiment of this application. The server 900 shown in FIG. 9 includes:

a sending module 901, configured to send a first model parameter and a second model parameter to a plurality of terminals, where the first model parameter and the second model parameter are adapted to a prediction model of the terminal;

a receiving module 902, configured to receive a first prediction loss sent by at least one of the plurality of terminals, where a first prediction loss sent by each of the at least one terminal is calculated by the terminal based on the prediction model that uses the first model parameter and the second model parameter; and a processing module 903, configured to: update the first model parameter based on the first prediction loss sent by the at least one terminal, to obtain an updated first model parameter, and update the second model parameter based on the first prediction loss sent by the at least one terminal, to obtain an updated second model parameter.

The terminal includes the prediction model used for prediction. The prediction model included in the terminal and a prediction model on the server are prediction models of a same type.

In an optional embodiment, the aspect of updating, by the processing module 903, the first model parameter based on the first prediction loss sent by the at least one terminal, to obtain an updated first model parameter, and updating the second model parameter based on the first prediction loss sent by the at least one terminal, to obtain an updated second model parameter specifically includes:

calculating, by the server, a second prediction loss based on the first prediction loss sent by the at least one terminal; and updating, by the server, the first model parameter based on the second prediction loss according to a parameter update rule, to obtain the updated first model parameter, and updating, by the server, the second model parameter based on the second prediction loss according to the parameter update rule, to obtain the updated second model parameter.

In an optional embodiment, the sending module 901 is further configured to send the updated first model parameter and the updated second model parameter to the plurality of terminals, and any one of the plurality of terminals performs prediction based on a prediction model that uses the updated first model parameter and the updated second model parameter.

In an optional embodiment, the plurality of terminals belong to a same group, and the terminals in the same group have a common characteristic.

In an optional embodiment, the common characteristic includes that at least two of the terminals are located within a preset geographical area.

It can be understood that for specific implementations of function blocks included in the server in FIG. 9 and corresponding beneficial effects, refer to specific descriptions of the foregoing embodiments shown in FIG. 3 to FIG. 5. Details are not described herein again.

Figure 10:
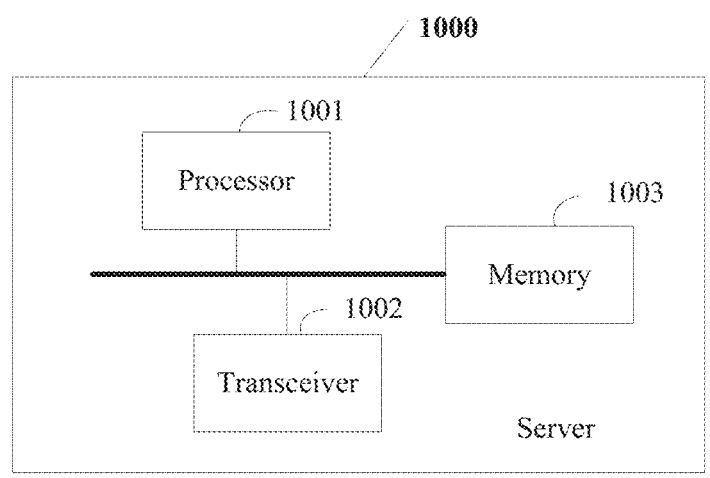
FIG. 10 is a schematic structural diagram of a server according to an embodiment of the present invention.

The server shown in FIG. 9 may be implemented by a server 1000 shown in FIG. 10. FIG. 10 is a schematic structural diagram of another server according to an embodiment of the present invention. The server 1000 shown in FIG. 10 includes a processor 1001 and a transceiver 1002. The transceiver 1002 is configured to support information transmission between the server 1000 and the terminal in the foregoing embodiments, for example, implement functions of the sending module 901 and the receiving module 902 in the embodiment shown in FIG. 9. The processor 1001 and the transceiver 1002 are communicatively connected, for example, connected through a bus. The server 1000 may further include a memory 1003. The memory 1003 is configured to store program code and data that are to be executed by the server 1000. The processor 1001 is configured to execute the application program code stored in the memory 1003, to implement actions of the server provided in any one of the embodiments shown in FIG. 3 to FIG. 5.

It should be noted that in actual application, the server may include one or more processors, and the structure of the server 1000 constitutes no limitation on this embodiment of this application.

The processor 1001 may be a CPU, an NP, a hardware chip, or any combination thereof. The hardware chip may be an ASIC, a PLD, or a combination thereof. The PLD may be a CPLD, an FPGA, a GAL, or any combination thereof.

The memory 1003 may include a volatile memory, for example, a RAM. The memory 1003 may alternatively include a non-volatile memory, for example, a ROM, a flash memory, a hard disk drive, or a solid-state drive. The memory 1003 may alternatively include a combination of the foregoing types of memories.

An embodiment of the present invention further provides a computer storage medium that may be configured to store a computer software instruction used by the server in the embodiment shown in FIG. 9. The computer software instruction includes a program designed for the server to implement the foregoing embodiment. The storage medium includes but is not limited to a flash memory, a hard disk drive, and a solid-state drive.

An embodiment of the present invention further provides a computer program product. When the computer product is run by a computing device, the prediction method designed for the server in the embodiment shown in FIG. 9 can be performed.

Embodiment 6

Figure 11:
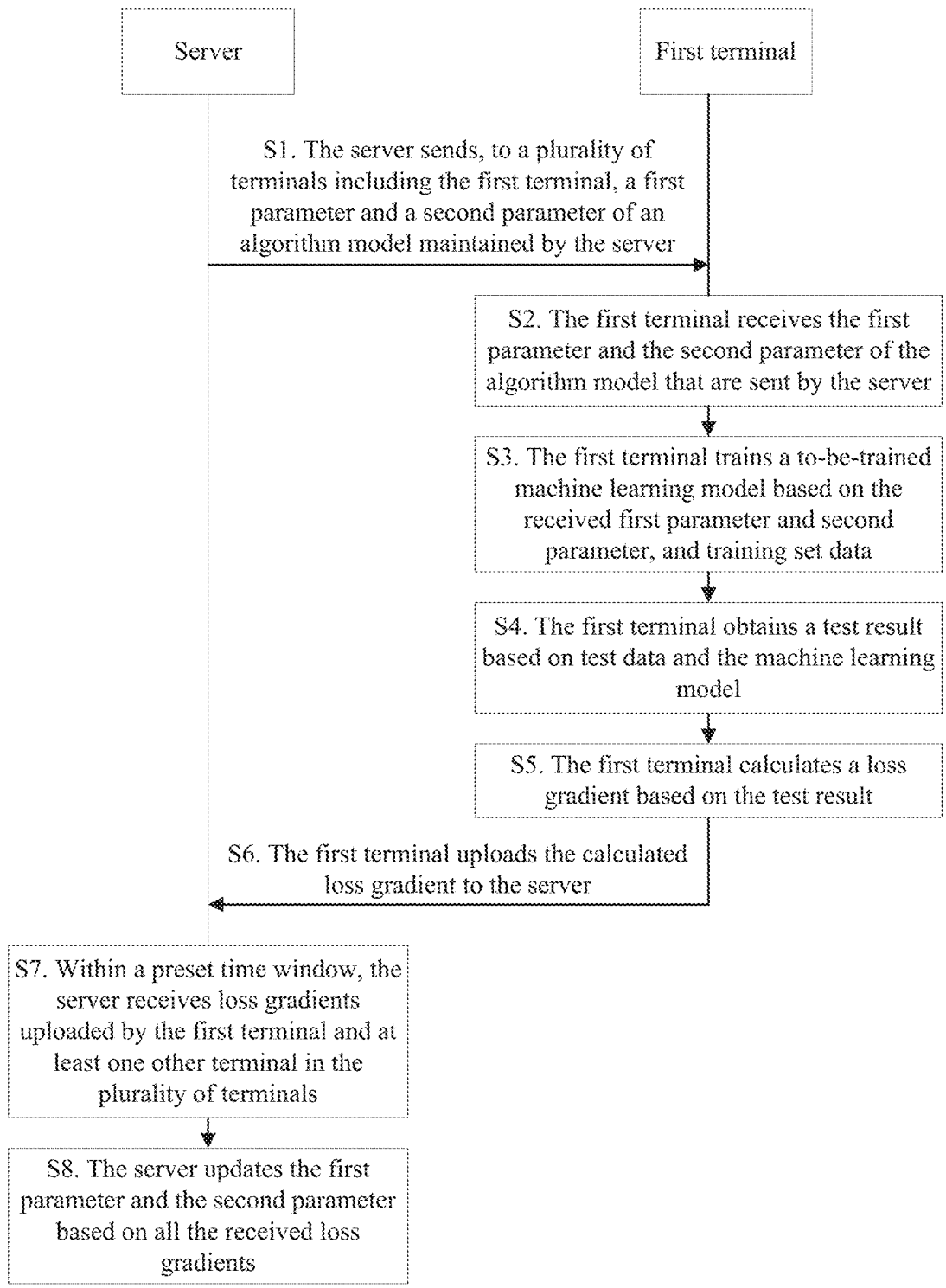
FIG. 11 is a flowchart of a machine learning model training method according to an embodiment of the present invention.

Both Embodiment 6 and Embodiment 3 are implemented in a small-sample joint learning framework. A main difference between Embodiment 6 and Embodiment 3 lies in: In Embodiment 3, the terminal uploads the prediction loss to the server, whereas in this embodiment of the present invention, the terminal uploads a loss gradient to the server. In short, the step of calculating a loss gradient based on a prediction loss is separately performed by the terminal (in Embodiment 6) and the server (in Embodiment 3). This embodiment of the present invention provides a machine learning model training method. In this embodiment, that a first terminal interacts with the server is used as an example, where the first terminal is any one of a plurality of terminals that establish a connection to the server. As shown in FIG. 11, the method includes the following steps.

S1. The server sends, to the plurality of terminals including the first terminal, a first parameter and a second parameter of an algorithm model maintained by the server, where the first parameter is used as an initial parameter of a machine learning model of each of the plurality of terminals, the second parameter is used to indicate a manner in which each of the plurality of terminals trains the machine learning model, and machine learning models of the plurality of terminals have a same structure. Optionally, before sending the first parameter and the second parameter of the algorithm model on the server to the plurality of terminals, the server initializes the first parameter and the second parameter of the algorithm model. For details about an initialization manner, refer to descriptions of the example part in Embodiment 3. Optionally, the plurality of terminals belong to a same group, and the same group is used to indicate that the plurality of terminals in the group have a same or similar attribute characteristic. Optionally, the attribute characteristic includes a geographical area. In other words, the server can maintain a common algorithm model for terminals in a geographical range.

S2. The first terminal receives the first parameter and the second parameter of the algorithm model that are sent by the server, where the first terminal is one of the plurality of terminals in S1.

S3. The first terminal trains the to-be-trained machine learning model based on the received first parameter and second parameter, and training set data, where the training set data includes a plurality of training samples, each training sample includes a first eigenvector and a corresponding first label, and the first eigenvector is constructed based on user information in historical data of the terminal.

S4. The first terminal obtains a test result based on test data and the machine learning model.

The training set data and the test data may be determined in the following manner: It is assumed that a terminal user has a total of M historical records that are arranged in chronological order, and it is set that $$M_1 = \left\lfloor \frac{4}{5}M \right\rfloor \text{ and } M_2 = \left\lfloor \frac{1}{5}M \right\rfloor.$$

The first $M_1$ historical records are used as a training set $S_{train}$, and Q historical records are randomly selected from the last $M_2$ historical records as a test set $S_{test}$, where $1 \leq Q \leq M_2$. If $M_2=0$, no small-sample training and prediction feedback is performed, that is, S3 to S6 are not performed; if $M_2 \geq 1$, when Q=1, a prediction loss gradient of the only test sample is calculated, and the gradient is uploaded to the server as a prediction feedback; and when Q>1, to reduce a volume of to-be-transmitted data, statistical processing is performed on prediction losses of the Q test samples and then a processing result is uploaded to the server. A statistical operation may include a plurality of manners, for example, performing averaging and gradient calculation; then, a resulting gradient is uploaded to the server. It should be noted that, that the first terminal finally uploads the loss gradient further needs to satisfy a preset condition described below.

S5. The first terminal calculates the loss gradient based on the test result.

S6. The first terminal uploads the calculated loss gradient to the server, where the loss gradient is used by the server to update the first parameter and the second parameter of the algorithm model.

Steps S3 to S6 in this embodiment of the present invention are corresponding to steps 302 to 304 in Embodiment 3. A main difference lies in that in this embodiment of the present invention, the loss gradient is calculated and then sent to the server, whereas in Embodiment 3, the prediction loss is calculated and then sent to the server. In this embodiment of the present invention, the loss gradient is used instead of the prediction loss, so that a size of uploaded data can be reduced.

S7. Within a preset time window, the server receives loss gradients uploaded by the first terminal and at least one other terminal in the plurality of terminals. Optionally, the server resets the preset time window based on a probability that the plurality of terminals upload the loss gradient. Herein, the plurality of terminals may include or may not include the first terminal. In addition to the preset time window, that a quantity of terminals that have sent a prediction feedback (the loss gradient) has reached a quantity threshold $N_0$ is used as a condition for stopping reception by the server. The quantity threshold may be calculated by using the following method: Assuming that the terminals sending the prediction feedback to the server are numbered 1, 2, . . . , N, and that for a terminal i, $p_i$ is defined as a ratio between a quantity of times the terminal i historically sends the prediction feedback to the server and a quantity of times the server sends a request to the terminal i (that is, $p_i$ is an estimate of a probability that the terminal i sends the prediction feedback), the quantity threshold is defined as an expectation of the quantity of terminals sending the prediction feedback:

$$N_0 = \sum_{i=1}^{N} p_i.$$

S8. The server updates the first parameter and the second parameter based on all the received loss gradients.

As described in Embodiment 3, that the server maintains a meta-learner using $(\theta,\alpha)$ as parameters is used as an example. It can be understood that the meta-learner is a specific example of the algorithm model. Assuming that the terminals feeding back the prediction loss gradient are numbered 1, 2, . . . , N, where the prediction loss gradient returned by the terminal i is $\nabla_{(\theta,\alpha)}L_i$, $(\theta,\alpha)$ are updated in the following manner:

$$(\theta, \alpha) \leftarrow (\theta, \alpha) - \frac{\beta}{N'}\sum_{i=1}^{N'}\nabla_{(\theta,\alpha)}L_i$$

where $\nabla$ represents a gradient; and the scalar $\beta$ is a fixed hyperparameter and represents a learning rate when the meta-learner is being updated.

Further, that the first terminal calculates the loss gradient based on the test result in S5 specifically includes the following steps.

S5.1. The first terminal calculates a prediction loss based on the test result and a label that is corresponding to the test data.

S5.2. The first terminal calculates the loss gradient based on the prediction loss.

Optionally, the test data includes a plurality of pieces of test sample data, each piece of test sample data includes a second eigenvector and a corresponding second label, and each piece of test sample data is corresponding to one test result.

Correspondingly, that the first terminal calculates a prediction loss based on the test result and a label that is corresponding to the test data in S5.1 specifically includes: The first terminal calculates a prediction loss of each of the plurality of pieces of test sample data based on the test result and the second label that are corresponding to each of the plurality of pieces of test sample data.

That the first terminal calculates the loss gradient based on the prediction loss in S5.2 specifically includes: The first terminal calculates a loss gradient of each of the plurality of pieces of test sample data based on the prediction loss of each of the plurality of pieces of test sample data; and the first terminal performs averaging processing on the plurality of calculated loss gradients, to obtain a target loss gradient.

That the first terminal uploads the loss gradient to the server in S6 specifically includes: The first terminal uploads the target loss gradient obtained through processing to the server.

Optionally, the test data includes a plurality of pieces of test sample data, each piece of test sample data includes a second eigenvector and a corresponding second label, and each piece of test sample data is corresponding to one test result.

Correspondingly, that the first terminal calculates a prediction loss based on the test result and a label that is corresponding to the test data in S5.1 specifically includes: The first terminal calculates a prediction loss of each of the plurality of pieces of test sample data based on the test result and the second label that are corresponding to each of the plurality of pieces of test sample data; and the first terminal averages a plurality of prediction losses corresponding to the plurality of pieces of test sample data, to obtain an average prediction loss.

That the first terminal calculates the loss gradient based on the prediction loss in S5.2 specifically includes: The first terminal calculates a target loss gradient based on the calculated average prediction loss.

That the first terminal uploads the loss gradient to the server in S6 specifically includes: The terminal uploads the target loss gradient that is calculated based on the average prediction loss to the server.

It should be noted that in addition to the foregoing two optional embodiments, in this embodiment of the present invention, when the test data includes a plurality of pieces of test sample data, a loss gradient of each test sample may be calculated and is uploaded to the server; or a prediction loss of each test sample is calculated and is uploaded to the server. For details, refer to related descriptions in the embodiments corresponding to FIG. 2 to FIG. 5.

Further, after the first terminal calculates the prediction loss of each of the plurality of pieces of test sample data based on the test result and the second label that are corresponding to each of the plurality of pieces of test sample data, the method further includes the following step.

The first terminal determines that the prediction loss of each of the plurality of pieces of test sample data satisfies a preset condition, where the preset condition is used to indicate that a fluctuation value relative to a last calculated average prediction loss is less than a preset threshold. Optionally, whether the preset condition is satisfied is determined in the following: Assuming that prediction losses corresponding to prediction feedbacks that have been historically sent $S_i$ times by the first terminal t are respectively $L_i^{(1)}$, $L_i^{(2)}$, ..., $L_i^{(S_i)}$, an average value of the prediction losses is calculated as follows:

$$\mu = \frac{1}{S_i}\sum_{k=1}^{S_i} L_i^{(k)},$$

and a standard deviation of the prediction losses is calculated as follows:

$$\sigma = \sqrt{\frac{1}{S_i}\sum_{k=1}^{S_i}(L_i^{(k)} - \mu)^2}.$$

If $L_i \in [\mu-3\sigma, \mu+3\sigma]$ holds true, the prediction is normal; otherwise, the prediction is abnormal. $[\mu-3\sigma, \mu+3\sigma]$ is equivalent to the preset condition.

Optionally, if the first terminal determines that a prediction loss of test sample data i does not satisfy the preset condition, the first terminal skips calculating a loss gradient corresponding to the prediction loss of the test sample data i, or skips calculating the average prediction loss based on the prediction loss of the test sample data i, where the test sample data i is any one of the plurality of pieces of test sample data.

Optionally, before the first terminal receives the first parameter and the second parameter of the algorithm model that are sent by the server in S2, the method further includes the following step.

S9. The first terminal sends a structure identifier of the machine learning model to the server, where the structure identifier is used by the server to determine, based on the structure identifier, the algorithm model corresponding to the machine learning model. Especially, when a plurality of tasks are performed concurrently, the identifier can be used to determine a needed parameter of the algorithm model. For example, there is a classification machine learning model and an application recommendation machine learning model on the first terminal. If the two models have different model structures, when the classification machine learning model needs to be trained, an identifier corresponding to the classification machine learning model may be uploaded, to notify the server of a needed parameter of the algorithm model. The same goes for the application recommendation machine learning model. When the application recommendation machine learning model needs to be trained, an identifier corresponding to the application recommendation machine learning model may be uploaded, to notify the server of a needed parameter of the algorithm model. When a computing capability of the first terminal permits, even if the first terminal needs to train the two models: the classification machine learning model and the application recommendation machine learning model, structure identifiers can be used to obtain parameters of the algorithm model on the server, to perform the plurality of tasks simultaneously. A relationship among the structure identifier, the machine learning model, and the algorithm model may be preconfigured, or may be negotiated through communication before being obtained. No limitation is imposed on the specific correspondence.

Correspondingly, before the server sends the first parameter and the second parameter to the plurality of terminals including the first terminal in S1, the method further includes: S10. The server receives structure identifiers, uploaded by the plurality of terminals, of the respective machine learning models, where the structure identifier is used by the server to determine the algorithm model corresponding to the structure of the machine learning model.

Optionally, the method further includes: S11. The server receives a prediction result score uploaded by the at least one terminal, where the prediction result score is given by a terminal user for a prediction result of the machine learning model. S12. The server determines a weighting coefficient based on the prediction result score. Herein, the at least one terminal may include or may not include the first terminal.

Correspondingly, that the server updates the first parameter and the second parameter based on the loss gradient uploaded by the at least one terminal in S8 specifically includes: The server performs, based on the weighting coefficient, weighted averaging processing on the loss gradient uploaded by the at least one terminal, to obtain a weighted loss gradient; and the server updates the first parameter and the second parameter based on the weighted loss gradient. For example, as described in Embodiment 3, that the server maintains a meta-learner using $(\theta,\alpha)$ as parameters is used as an example. If receiving prediction loss gradients $\nabla_{(\theta,\alpha)}L_i$ sent by N' terminals, the server calculates an average value $$\frac{1}{N'}\sum_{i=1}^{N'}\nabla_{(\theta,\alpha)}L_i$$

of all the gradients and updates the parameters of the meta-learner by using the average value.

Optionally, the method further includes: S13. The server receives a parameter update request sent by the first terminal, where the parameter update request is used to request the server to send a last updated first parameter and second parameter, and the first terminal is any one of the plurality of terminals; and the server sends the last updated first parameter and second parameter to the first terminal.

It should be noted that the method performed by the server in the foregoing embodiment may be implemented by the server shown in FIG. 9 or FIG. 10, and the method performed by the first terminal in the foregoing embodiment may be implemented by the terminal shown in FIG. 6 or FIG. 8. For specific descriptions, refer to the embodiments corresponding to the foregoing figures. Details are not described herein again.

As described in Embodiment 3, that a next APP is recommended is used as an example. A Meta-SGD is used as a small-sample learning algorithm model. To avoid redundancy, content already described in the foregoing embodiments may not be repeated in this embodiment of the present invention. For details, refer to the foregoing embodiments.

Server: As described in Embodiment 3, the server maintains a meta-learner using $(\theta,\alpha)$ as parameters. A difference between the steps performed by the server in this embodiment of the present invention and the steps performed by the server in Embodiment 3 is: In this embodiment of the present invention, the loss gradient (the prediction loss gradient) received by the server from each terminal is $\nabla_{(\theta,\alpha)} L_i$, and herein, $\nabla_{(\theta,\alpha)} L_i$ is a function of $(\theta,\alpha)$; and assuming that the terminals returning the prediction feedback are numbered 1.2, ..., N, where the prediction loss gradient returned by the terminal i is $\nabla_{(\theta,\alpha)} L_i$, $(\theta,\alpha)$ are updated in the following manner:

$$(\theta, \alpha) \leftarrow (\theta, \alpha) - \beta \sum_{i=1}^{N'} \nabla_{(\theta,\alpha)} L_i$$

where $\nabla$ represents a gradient; and the scalar $\beta$ is a fixed hyperparameter and represents a learning rate when the meta-learner is being updated.

Terminal side: In this embodiment of the present invention, the terminal performs the following step:

Maintain a counter $S_i$, to record a quantity of times the terminal i has sent the prediction feedback (loss gradient) currently. If small-sample training is performed for the first time, the counter is initialized as $S_i \leftarrow 0$.

It is assumed that the terminal user has a total of M historical records that are arranged in chronological order, and it is set that $$M_1 = \left\lfloor \frac{4}{5} M \right\rfloor \text{ and } M_2 = \left\lfloor \frac{1}{5} M \right\rfloor.$$

The first $M_1$ historical records are used as a training set $\mathcal{S}_{train}$, and Q historical records are randomly selected from the last $M_2$ historical records as a test set $\mathcal{S}_{test}$, where $1 \leq Q \leq M_2$.

The terminal receives the parameters $(\theta,\alpha)$ sent by the server, where the first parameter is corresponding to $\theta$, and the second parameter is corresponding to a; and for a recommendation model using the parameter $\theta$, it is defined that a loss function of the model on a sample (x,k) (where x is an eigenvector, and k represents the $k^{th}$ APP corresponding to the sample label) is $\ell(f_\theta(x),k) = -\log(f_\theta(x))_k$.

The recommendation model is trained in the following manner (content following // is an annotation): $\theta'_i \leftarrow \theta$ //initialize the local prediction model by using 0;

for t=1, 2, ..., T do // iterate T times to optimize the local prediction model, where for example, T=100, $$\mathcal{L}_i^{train}(\theta'_i) \leftarrow \frac{1}{|S_{train}|} \sum_{(x,k) \in S_{train}} \ell(f_{\theta'_i}(x), k)$$

calculate a training set loss; and $\theta'_i \leftarrow \theta'_i - \alpha \circ \nabla_{\theta'_i} \mathcal{L}_i^{train}(\theta'_i)$ // update the parameters of the prediction model, where herein "∘" is a component multiplication operation of a vector, for example, $(a_1, a_2) \circ (b_1, b_2) = (a_1 b_1, a_2 b_2)$.

A prediction loss of $\theta'_i$ on a test set is calculated as follows:

$$\mathcal{L}_i^{test}(\theta'_i) \leftarrow \frac{1}{|S_{test}|} \sum_{(x,k) \in S_{test}} \ell(f_{\theta'_i}(x), k)$$

If the prediction result is normal, the gradient $\nabla_{(\theta,\alpha)} L_i$ of the prediction loss $L_i = \mathcal{L}(\theta'_i)$ is uploaded to the server, and the counter is updated to $S_i \leftarrow S_i + 1$. If the prediction result is abnormal, no prediction feedback is uploaded, and the counter is not updated. A condition for determining abnormality is as follows:

Assuming that prediction losses corresponding to prediction feedbacks that have been historically sent $S_i$ times by the terminal i are respectively $L_i^{(1)}, L_i^{(2)}, \ldots, L_i^{(S_i)}$, an average value of the prediction losses is calculated as follows:

$$\mu = \frac{1}{S_i} \sum_{k=1}^{S_i} L_i^{(k)},$$

and a standard deviation of the prediction losses is calculated as follows:

$$\sigma = \sqrt{\frac{1}{S_i} \sum_{k=1}^{S_i} (L_i^{(k)} - \mu)^2}.$$

If $L_i \in [\mu - 3\sigma, \mu + 3\sigma]$ holds true, the prediction is normal; otherwise, the prediction is abnormal.

Embodiment 7

Figure 12:
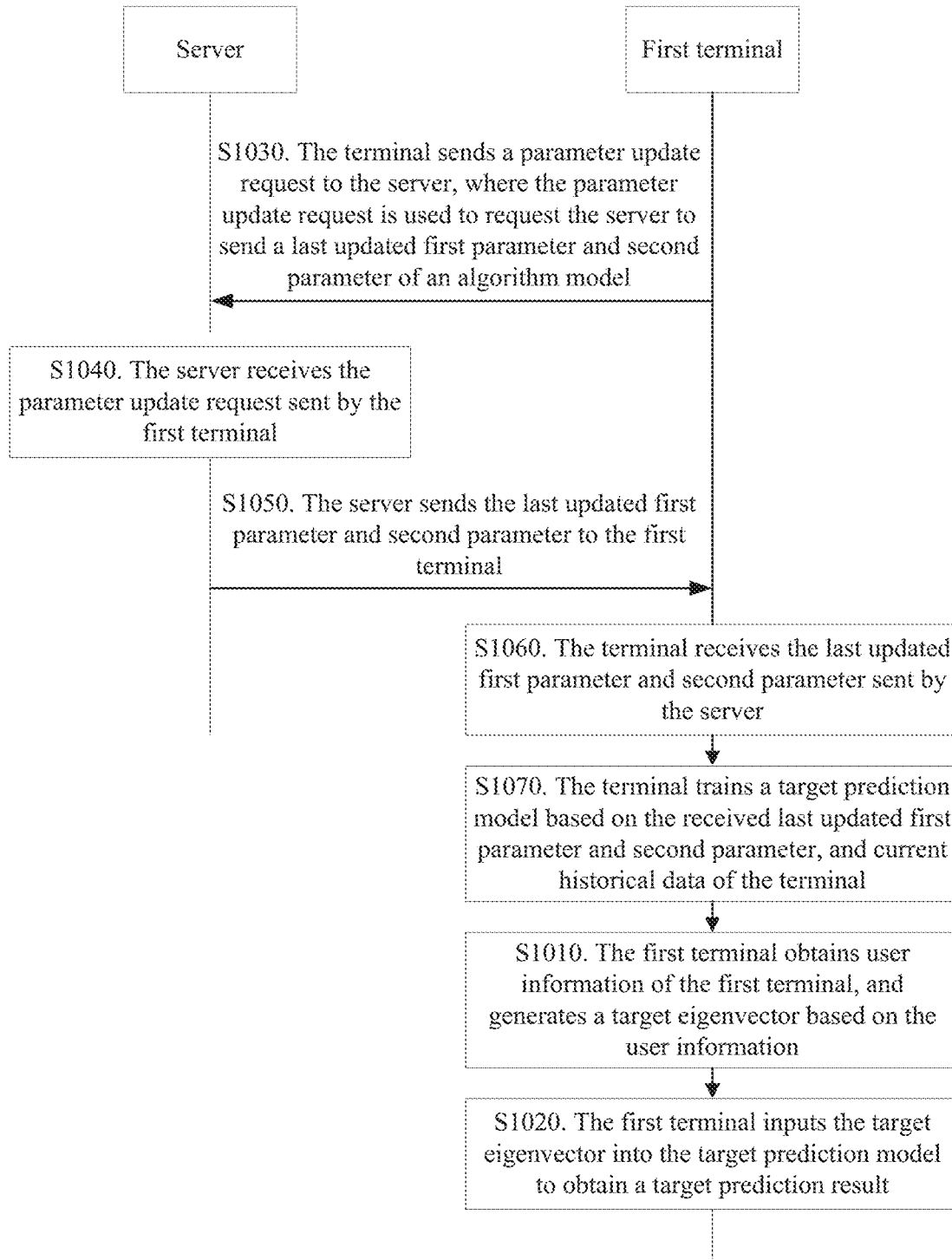
FIG. 12 is a flowchart of a prediction method according to an embodiment of the present invention.

This embodiment of the present invention further provides a prediction method. Prediction means predicting a type of task based on a machine learning model. For example, all of picture classification, application recommendation, and image recognition may be considered as a prediction behavior. As shown in FIG. 12, the method includes the following steps.

S1010. A first terminal obtains user information of the first terminal, and generates a target eigenvector based on the user information.

S1020. The first terminal inputs the target eigenvector into a target prediction model to obtain a target prediction result.

The target prediction model is a machine learning model that is obtained through training by the first terminal based on a first parameter, a second parameter, and historical data of the terminal; the first parameter and the second parameter are two parameters of an algorithm model on a server that are sent by the server and that are corresponding to the machine learning model of the terminal; the first parameter is used as an initial parameter of the machine learning model of the first terminal; the second parameter is used to indicate a manner in which the first terminal trains the machine learning model; the first parameter and the second parameter are obtained by the server based on a plurality of loss gradients fed back by a plurality of terminals; and any loss gradient is calculated by a corresponding terminal based on local historical data. For a specific manner of calculating the loss gradient, refer to descriptions of the corresponding part in the foregoing embodiments. The plurality of terminals include the first terminal.

Generally, the machine learning model of the terminal has been trained before being used, and a specific training manner is the machine learning model training method described in the foregoing embodiments. Optionally, before prediction is performed by using the machine learning model, the method further includes the following steps:

S1030. The terminal sends a parameter update request to the server, where the parameter update request is used to request the server to send a last updated first parameter and second parameter of the algorithm model. S1040. The server receives the parameter update request sent by the first terminal, where the parameter update request is used to request the server to send the last updated first parameter and second parameter, and the first terminal is any one of the plurality of terminals. S1050. The server sends the last updated first parameter and second parameter to the first terminal. S1060. The terminal receives the last updated first parameter and second parameter sent by the server. S1070. The terminal trains the target prediction model based on the received last updated first parameter and second parameter, and the current historical data of the terminal. Correspondingly, that the first terminal inputs the target eigenvector into a target prediction model to obtain a target prediction result in S1020 specifically includes: The first terminal inputs the target eigenvector into the trained target prediction model to obtain the target prediction result. In this way, before the target prediction model is used, the target prediction model may further be trained for one time based on the first parameter and the second parameter that are newly updated by the server and the historical data newly generated on the terminal, and then prediction is performed, so as to achieve a better prediction effect.

Optionally, the parameter update request sent by the first terminal to the server includes a structure identifier of the machine learning model corresponding to the target prediction model, where the structure identifier is used by the server to determine the algorithm model corresponding to the target prediction model.

Further, after the first terminal inputs the target eigenvector into the target prediction model to obtain the target prediction result, the method further includes: The first terminal obtains a prediction result score given by a user for the target prediction result, and uploads the prediction result score to the server. The prediction result score is given by the user of the first terminal for the target prediction result, the prediction result score is used by the server to determine a weighting coefficient, the weighting coefficient is used by the server to process the loss gradients uploaded by the plurality of terminals, to obtain a weighted loss gradient, and the weighted loss gradient is used by the server to update the first parameter and the second parameter. The first terminal may proactively obtain the prediction result score given by the user for the target prediction result and send the prediction result score to the server. Alternatively, the first terminal may obtain the prediction result score given by the user for the target prediction result and upload the prediction result score, after receiving a user feedback request periodically sent by the server to the terminal. The following uses the second case as an example.

Sending the user feedback request by the server to the terminal may be performed in the following manner: sending the user feedback request periodically (for example, once a month). The user feedback request is used to require the terminal user to (subjectively) evaluate a prediction effect and give a score from 0 to 10, where 0 represents a very poor effect, and 10 represents a very good effect. After receiving the user feedback request, the terminal instructs the terminal user to give a score for the prediction effect, and uploads the prediction result score given by the user for the target prediction result when uploading a prediction feedback (namely, a loss gradient or a prediction loss) next time. When updating the parameters, the server references the score given by the user. If the server does not receive the score given by the terminal user, the server uses a default value: 5 points. The score given by the terminal user may be used in the following manner: (a) A higher score given by the terminal user indicates that model training performed by a meta-learner for the terminal user is most effective, and that a weight corresponding to the terminal user when the parameters of the meta-learner are being updated is greater; or (b) A lower score given by the terminal user indicates that the meta-learner should improve an effect of model training for the terminal user, and that a weight corresponding to the terminal user when the parameters of the meta-learner are being updated is greater. Herein, the meta-learner is referred to as the algorithm model. For example, the manner (a) is used, that is, a higher score given by the terminal user indicates a greater corresponding weight. Details are as follows:

Assuming that terminals returning the prediction feedback are numbered 1, 2, . . . , N', and that the prediction loss gradient returned by a terminal i is $\nabla_{(\theta,\alpha)}L_i$, $(\theta, \alpha)$ are updated in the following manner:

$$(\theta, \alpha) \leftarrow (\theta, \alpha) - \frac{\beta}{\sum_{i=1}^{N'} e^{\lambda(\sigma_i - 5)}} \sum_{i=1}^{N'} e^{\lambda(\sigma_i - 5)} \nabla_{(\theta,\alpha)} L_i$$

where $\nabla$ represents a gradient; the scalar $\beta$ is a fixed hyperparameter and represents a learning rate when the meta-learner is being updated; and $c_i$ is a score given by a user of the terminal i, and $\lambda$ is a fixed coefficient.

It should be noted that the method performed by the server in the foregoing embodiment may be implemented by the server shown in FIG. 9 or FIG. 10, and the method performed by the first terminal in the foregoing embodiment may be implemented by the terminal shown in FIG. 6, FIG. 7, or FIG. 8. For specific descriptions, refer to the embodiments corresponding to the foregoing figures. Details are not described herein again.

For the algorithm model on the server and the machine learning model (for example, the prediction model) of the terminal, optionally, the models of the two ends are both small-scale models, or the model on the server is a small-scale model, or the model of the terminal is a small-scale model. The small-scale model is relative to a conventional neural network.

In the specification, claims, and accompanying drawings of this application, the terms such as "first", "second", "third", and "fourth" are intended to distinguish between different objects but do not indicate a particular order. In addition, the terms "including" and "comprising", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art can understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedure or functions according to the embodiments of the present invention are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

A person of ordinary skill in the art can understand that all or some of the processes of the methods in the embodiments may be implemented by a computer program instructing relevant hardware. The program may be stored in a computer-readable storage medium. When the program is executed, the processes in the method embodiments are performed. The foregoing storage medium may include: a magnetic disk, an optical disc, a read-only memory (ROM), a random access memory (RAM), or the like.

What is disclosed above is merely examples of embodiments of the present invention, and certainly is not intended to limit the protection scope of the present invention. Therefore, equivalent variations made in accordance with the claims of the present invention shall fall within the scope of the present invention.

What is claimed is:

1. A machine learning model training method, comprising:
    receiving, by a terminal, a first parameter and a second parameter of an algorithm model on a server that are sent by the server, wherein the first parameter is used as an initial parameter of a machine learning model of the terminal, wherein the second parameter is used to indicate a manner in which the terminal trains the machine learning model, and wherein the first parameter comprises a first vector comprising a first plurality of components, the second parameter comprises a second vector comprising a second plurality of components, and the first plurality of components of the first parameter and the second plurality of components of the second parameter are in one-to-one correspondence;
    training, by the terminal, the machine learning model on the terminal based on the first parameter, the second parameter, and training set data, wherein the training set data comprises a plurality of training samples, wherein each training sample comprises a first eigenvector and a corresponding first label, and wherein the first eigenvector is constructed based on user information in historical data of the terminal;
    obtaining, by the terminal, a test result based on test data and the machine learning model;
    calculating, by the terminal, a loss gradient based on the test result; and
    uploading, by the terminal, the loss gradient to the server, wherein the loss gradient is used by the server to update the first parameter and the second parameter.

2. The method according to claim 1, wherein the calculating, by the terminal, a loss gradient based on the test result comprises:
    calculating, by the terminal, a prediction loss based on the test result and a label that is corresponding to the test data; and
    calculating, by the terminal, the loss gradient based on the prediction loss.

3. The method according to claim 2, wherein the test data comprises a plurality of pieces of test sample data, wherein each piece of test sample data comprises a second eigenvector and a corresponding second label, and wherein each piece of test sample data is corresponding to one test result, wherein:
    the calculating, by the terminal, a prediction loss based on the test result and a label that is corresponding to the test data comprises:
        calculating, by the terminal, a prediction loss of each of the plurality of pieces of test sample data based on the test result and the second label that are corresponding to each of the plurality of pieces of test sample data;
    the calculating, by the terminal, the loss gradient based on the prediction loss comprises:
        calculating, by the terminal, a loss gradient of each of the plurality of pieces of test sample data based on the prediction loss of each of the plurality of pieces of test sample data; and
        performing, by the terminal, average processing on a plurality of loss gradients corresponding to the plurality of pieces of test sample data to obtain a target loss gradient; and
    the uploading, by the terminal, the loss gradient to the server comprises:
        uploading, by the terminal, the target loss gradient to the server.

4. The method according to claim 2, wherein the test data comprises a plurality of pieces of test sample data, wherein each piece of test sample data comprises a second eigenvector and a corresponding second label, and wherein each piece of test sample data is corresponding to one test result, wherein:
    the calculating, by the terminal, a prediction loss based on the test result and a label that is corresponding to the test data comprises:
        calculating, by the terminal, a prediction loss of each of the plurality of pieces of test sample data based on the test result and the second label that are corresponding to each of the plurality of pieces of test sample data; and
        averaging, by the terminal, a plurality of prediction losses corresponding to the plurality of pieces of test sample data to obtain an average prediction loss;
    the calculating, by the terminal, the loss gradient based on the prediction loss comprises:
        calculating, by the terminal, a target loss gradient based on the average prediction loss; and the uploading, by the terminal, the loss gradient to the server comprises:
   uploading, by the terminal, the target loss gradient to the server.

5. The method according to claim 3, after the calculating, by the terminal, a prediction loss of each of the plurality of pieces of test sample data based on the test result and the second label that are corresponding to each of the plurality of pieces of test sample data, further comprising:
   determining, by the terminal, that the prediction loss of each of the plurality of pieces of test sample data satisfies a preset condition, wherein the preset condition is used to indicate that a fluctuation value relative to a last calculated average prediction loss is less than a preset threshold, and wherein the average prediction loss is obtained by the terminal by averaging a plurality of prediction losses corresponding to the plurality of pieces of test sample data.

6. The method according to claim 5, comprising:
   in response to determining that a prediction loss of test sample data i does not satisfy the preset condition,
      skipping calculating, by the terminal, a loss gradient corresponding to the prediction loss of the test sample data i; or
      skipping calculating the average prediction loss based on the prediction loss of the test sample data i,
   wherein the test sample data i is any one of the plurality of pieces of test sample data.

7. The method according to claim 1, before the receiving, by a terminal, a first parameter and a second parameter of an algorithm model on a server that are sent by the server, comprising:
   sending, by the terminal, a structure identifier of the machine learning model to the server, wherein the structure identifier is used by the server to determine, based on the structure identifier, the algorithm model corresponding to the machine learning model.

8. A prediction method, comprising:
   obtaining, by a first terminal, user information of the first terminal;
   generating, by the first terminal, a target eigenvector based on the user information; and
   inputting, by the first terminal, the target eigenvector into a target prediction model to obtain a target prediction result,
   wherein the target prediction model is a local machine learning model that is obtained through training by the first terminal based on a first parameter, a second parameter, and historical data of the first terminal, wherein the first parameter and the second parameter are two parameters of an algorithm model on a server that are sent by the server, wherein the first parameter is used as an initial parameter of the machine learning model of the first terminal, wherein the second parameter is used to indicate a manner in which the first terminal trains the machine learning model, wherein the first parameter comprises a first vector comprising a first plurality of components, the second parameter comprises a second vector comprising a second plurality of components, and the first plurality of components of the first parameter and the second plurality of components of the second parameter are in one-to-one correspondence, wherein the first parameter and the second parameter are obtained by the server based on a plurality of loss gradients fed back by a plurality of terminals, and wherein any loss gradient is calculated by a corresponding terminal based on local historical data.

9. The method according to claim 8, before the inputting, by the first terminal, the target eigenvector into a target prediction model to obtain a target prediction result, comprising:
   sending, by the first terminal, a parameter update request to the server, wherein the parameter update request is used to request the server to send a last updated first parameter and second parameter of the algorithm model;
   receiving, by the first terminal, the last updated first parameter and second parameter that are sent by the server; and
   training, by the first terminal, the target prediction model based on the last updated first parameter and second parameter and the historical data of the first terminal,
   wherein the inputting, by the first terminal, the target eigenvector into a target prediction model to obtain a target prediction result comprises:
      inputting, by the first terminal, the target eigenvector into a trained target prediction model to obtain the target prediction result.

10. The method according to claim 9, wherein the parameter update request comprises a structure identifier of the machine learning model corresponding to the target prediction model, and wherein the structure identifier is used by the server to determine, based on the structure identifier, the algorithm model corresponding to the target prediction model.

11. The method according to claim 8, after the inputting, by the first terminal, the target eigenvector into a target prediction model to obtain a target prediction result, further comprising:
   uploading, by the first terminal, a prediction result score to the server, wherein the prediction result score is given by a user of the first terminal for the target prediction result, wherein the prediction result score is used by the server to determine a weighting coefficient, wherein the weighting coefficient is used by the server to process the loss gradients uploaded by the plurality of terminals to obtain a weighted loss gradient, wherein the weighted loss gradient is used by the server to update the first parameter and the second parameter, and wherein the plurality of terminals comprise the first terminal.

12. A machine learning model training method, comprising:
   sending, by a server, a first parameter and a second parameter of an algorithm model on the server to a plurality of terminals, wherein the first parameter is used as an initial parameter of a machine learning model of each of the plurality of terminals, wherein the second parameter is used to indicate a manner in which each of the plurality of terminals trains the machine learning model, wherein the first parameter comprises a first vector comprising a first plurality of components, the second parameter comprises a second vector comprising a second plurality of components, and the first plurality of components of the first parameter and the second plurality of components of the second parameter are in one-to-one correspondence, and wherein machine learning models of the plurality of terminals have a same structure;

receiving, by the server and within a preset time window, a loss gradient uploaded by at least one terminal of the plurality of terminals; and updating, by the server, the first parameter and the second parameter based on the loss gradient uploaded by the at least one terminal.

13. The method according to claim 12, before the sending, by a server, a first parameter and a second parameter to a plurality of terminals, comprising:

initializing, by the server, the first parameter and the second parameter of the algorithm model.

14. The method according to claim 12, comprising:

resetting, by the server, the preset time window based on a probability that the plurality of terminals upload the loss gradient.

15. The method according to claim 12, wherein the plurality of terminals belong to a same group, and wherein the same group is used to indicate that the plurality of terminals in the group have a same or similar attribute characteristic.

16. The method according to claim 15, wherein the attribute characteristic comprises a geographical area.

17. The method according to claim 12, further comprising:

receiving, by the server, a prediction result score uploaded by the at least one terminal, wherein the prediction result score is given by a terminal user for a prediction result of the machine learning model; and determining, by the server, a weighting coefficient based on the prediction result score;

wherein the updating, by the server, the first parameter and the second parameter based on the loss gradient uploaded by the at least one terminal comprises:

performing, by the server and based on the weighting coefficient, weighted averaging processing on the loss gradient uploaded by the at least one terminal to obtain a weighted loss gradient; and updating, by the server, the first parameter and the second parameter based on the weighted loss gradient.

18. The method according to claim 12, before the sending, by a server, a first parameter and a second parameter to a plurality of terminals, further comprising:

receiving, by the server, a structure identifier, uploaded by the plurality of terminals, of a respective machine learning model, wherein the structure identifier is used by the server to determine the algorithm model corresponding to a structure of the respective machine learning model.

19. The method according to claim 12, comprising:

receiving, by the server, a parameter update request sent by a first terminal, wherein the parameter update request is used to request the server to send a last updated first parameter and second parameter, and wherein the first terminal is any one of the plurality of terminals; and sending, by the server, the last updated first parameter and second parameter to the first terminal.

20. A terminal, comprising at least one processor and a storage medium, wherein the storage medium stores programmable instructions, and wherein the programmable instructions, when executed by the at least one processor, instruct the at least one processor to perform operations comprising :

obtaining, by a first terminal, user information of the first terminal;

generating, by the first terminal, a target eigenvector based on the user information; and inputting, by the first terminal, the target eigenvector into a target prediction model to obtain a target prediction result, wherein the target prediction model is a local machine learning model that is obtained through training by the first terminal based on a first parameter, a second parameter, and historical data of the first terminal, wherein the first parameter and the second parameter are two parameters of an algorithm model on a server that are sent by the server, wherein the first parameter is used as an initial parameter of the machine learning model of the first terminal, wherein the second parameter is used to indicate a manner in which the first terminal trains the machine learning model, wherein the first parameter comprises a first vector comprising a first plurality of components, the second parameter comprises a second vector comprising a second plurality of components, and the first plurality of components of the first parameter and the second plurality of components of the second parameter are in one-to-one correspondence, wherein the first parameter and the second parameter are obtained by the server based on a plurality of loss gradients fed back by a plurality of terminals, and wherein any loss gradient is calculated by a corresponding terminal based on local historical data.

* * * * *